US012516088B2

(12) United States Patent
Yang et al.

(10) Patent No.: US 12,516,088 B2
(45) Date of Patent: Jan. 6, 2026

(54) FUSION FRAGMENT CHIMERIC ANTIGEN RECEPTORS AND USES THEREOF

(71) Applicant: The Regents of the University of California, Oakland, CA (US)

(72) Inventors: Otto O. Yang, Los Angeles, CA (US); Balamurugan Arumugam, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1183 days.

(21) Appl. No.: 17/252,228

(22) PCT Filed: Jun. 13, 2019

(86) PCT No.: PCT/US2019/037048
§ 371 (c)(1),
(2) Date: Dec. 14, 2020

(87) PCT Pub. No.: WO2019/241557
PCT Pub. Date: Dec. 19, 2019

(65) Prior Publication Data

US 2021/0252068 A1 Aug. 19, 2021

Related U.S. Application Data

(60) Provisional application No. 62/685,313, filed on Jun. 15, 2018.

(51) Int. Cl.

| | |
|---|---|
| ***C07K 14/15*** | (2006.01) |
| ***A61K 35/28*** | (2015.01) |
| ***A61K 40/10*** | (2025.01) |
| ***A61K 40/31*** | (2025.01) |
| ***A61K 40/46*** | (2025.01) |
| ***C07K 14/705*** | (2006.01) |
| ***C07K 14/725*** | (2006.01) |
| ***C12N 15/62*** | (2006.01) |
| ***C12N 15/85*** | (2006.01) |

(52) U.S. Cl.
CPC .............. *C07K 14/15* (2013.01); *A61K 35/28* (2013.01); *A61K 40/10* (2025.01); *A61K 40/31* (2025.01); *A61K 40/46* (2025.01); *C07K 14/7051* (2013.01); *C07K 14/70517* (2013.01); *C12N 15/62* (2013.01); *C12N 15/85* (2013.01)

(58) Field of Classification Search
CPC .... A61K 35/17; C07K 14/15; C07K 14/7051; C07K 14/70517; C12N 15/62; A61P 31/18
See application file for complete search history.

(56) References Cited

U.S. PATENT DOCUMENTS

| | | | | |
|---|---|---|---|---|
| 9,951,118 B2 * | 4/2018 | Kitchen | ............. | C07K 16/1045 |
| 2011/0263830 A1 * | 10/2011 | Goetsch | ................ | C07K 1/107<br>536/23.53 |
| 2011/0269676 A1 * | 11/2011 | Jiang | ....................... | A61P 31/18<br>514/21.3 |
| 2016/0194375 A1 * | 7/2016 | Kitchen | ............ | A61K 2239/38<br>435/325 |
| 2017/0267756 A1 * | 9/2017 | Riddell | .............. | A61K 38/1774 |

FOREIGN PATENT DOCUMENTS

| | | |
|---|---|---|
| WO | 2000040616 | 7/2000 |
| WO | 2005018666 A1 | 3/2005 |
| WO | 2011140092 | 11/2011 |
| WO | 2015017755 | 2/2015 |
| WO | 2019126464 | 6/2019 |

OTHER PUBLICATIONS

Gacerez, Albert T., Benjamine Arellano, and Charles L. Sentman. "How chimeric antigen receptor design affects adoptive T cell therapy." Journal of cellular physiology 231.12 (2016): 2590-2598. (Year: 2016).*
White JM, Delos SE, Brecher M, Schornberg K. Structures and mechanisms of viral membrane fusion proteins: multiple variations on a common theme. Crit Rev Biochem Mol Biol. May-Jun. 2008;43(3):189-219. (Year: 2008).*
Egelhofer, Marc, et al. "Inhibition of human immunodeficiency virus type 1 entry in cells expressing gp41-derived peptides." Journal of virology 78.2 (2004): 568-575. (Year: 2004).*
Wild, Carl T., et al. "Peptides corresponding to a predictive alpha-helical domain of human immunodeficiency virus type 1 gp41 are potent inhibitors of virus infection." Proceedings of the National Academy of Sciences 91.21 (1994): 9770-9774. (Year: 1994).*
Extended European Search report received in EP19818624.9, mailed Feb. 28, 2022.
Chupradit et al., Current Peptide and Protein Candidates Challenging HIV Therapy beyond the Vaccine Era, Sep. 29, 2017, p. 281, vol. 9, No. 10, Publisher: Viruses.
Zhen et al., Chimeric antigen receptor engineered stem cells: a novel HIV therapy, Mar. 1, 2017, pp. 401-410, vol. 9, No. 5, Publisher: Immunotherapy.
International Search Report received in PCT/US2019/037048, mailed Nov. 18, 2019.
Written Opinion received in PCT/US2019/037048, mailed Nov. 18, 2019.
Halldorsson, et al., "Shielding and activation of a viral membrane fusion protein", Jan. 24, 2018, p. 349, vol. 9, Publisher: Nat Commun.
Harrison, "Viral membrane fusion", Jul. 2008, pp. 690-698, vol. 15, No. 7, Publisher: Nature structural & molecular biology.

(Continued)

*Primary Examiner* — Christopher M Babic
*Assistant Examiner* — Michael Angelo Riga
(74) *Attorney, Agent, or Firm* — Suzannah K. Sundby, Esq.; Canady + Lortz LLP

(57) ABSTRACT

Disclosed herein are fusion fragment chimeric antigen receptors (FF-CARs), engineered cells expressing FF-CARs, and methods of using thereof to treat, reduce, or inhibit infections by enveloped viruses in subjects.

15 Claims, 7 Drawing Sheets

Specification includes a Sequence Listing.

(56) References Cited

OTHER PUBLICATIONS

Kielian, "Mechanisms of Virus Membrane Fusion Proteins", Nov. 2014, pp. 7-89, vol. 1, No. 1, Publisher: Annual review of virology.
MacLean, et al., "A novel real-time CTL assay to measure designer T-cell function against HIV Env(+) cells", Oct. 1, 2014, pp. 341-348, vol. 43, No. 5, Publisher: Journal of medical primatology.
Sanders et al., "Mutational Analyses and Natural Variability of the gp41 Ectodomain", Dec. 2002, pp. 1-23, Publisher: HIV Molecular Immunology.
White, et al., "Structures and mechanisms of viral membrane fusion proteins: multiple variations on a common theme", May 2008, pp. 189-219, vol. 43, No. 3, Publisher: Critical reviews in biochemistry and molecular biology.
Zhen, et al., "Long-term persistence and function of hematopoietic stem cell-derived chimeric antigen receptor T cells in a nonhuman primate model of HIV/AIDS", Dec. 28, 2017, p. e1006753, vol. 13, No. 12, Publisher: PLOS pathogens.

* cited by examiner

| | |
|---|---|
| EPKSCDKTHTCPPCPAPEL | $IgG_1$ Hinge |
| ELKTPLGDTTHTCPRCPEPKSCDTPPPCPRCPEPKSCDTPPPCPRCPEPKSCDTPPPCPRCPAPEL | $IgG_3$ Hinge |
| ELKTPLGDTTHTSPRSPEPKSSDTPPPSPRSPEPKSSDTPPPSPRSPEPKSSDTPPPCPRCPAPEL | Mod-$IgG_3$ Hinge |
| SKYGPPCPSCP | $IgG_4$ Hinge |

FUSION FRAGMENT CHIMERIC ANTIGEN RECEPTORS AND USES THEREOF

CROSS-REFERENCE TO RELATED APPLICATIONS

This application is a 371 national phase entry of PCT/US2019/037048 filed Jun. 13, 2019, which claims the benefit of U.S. Application No. 62/685,313, filed Jun. 15, 2018.

ACKNOWLEDGEMENT OF GOVERNMENT SUPPORT

This invention was made with Government support under AI117941, awarded by the National Institutes of Health. The Government has certain rights in the invention.

REFERENCE TO A SEQUENCE LISTING SUBMITTED VIA EFS-WEB

The content of the ASCII text file of the sequence listing named "20190613_034044_184WO1_ST25" which is 45.8 KB in size was created on Jun. 13, 2019, and electronically submitted via EFS-Web herewith the application is incorporated herein by reference in its entirety.

BACKGROUND OF THE INVENTION

1. Field of the Invention

The present invention generally relates to fusion fragment chimeric antigen receptors (FF-CARs) specific for enveloped viruses and engineered cells expressing FF-CARs.

2. Description of the Related Art

Chimeric antigen receptors (CARs) are artificial receptors that are used to engineer immune effector cells having specificity for a given target. Typically, CARs comprise a single chain antibody, a hinge region a transmembrane domain, and a CD3ζ intracellular domain with or without a costimulatory domain (from, e.g., 4-1BB or CD28). See, e.g., (1-3). An example of such a typical CAR is schematically shown in FIG. 1.

An enveloped virus infects host cells by membrane fusion, which is mediated by a fusion protein on the virus envelope. There are three classes of fusion proteins and their structures and mechanisms are known in the art. See, e.g., (4-6). Membrane fusion between HIV (and viruses such as Ebolavirus, and *Influenzavirus*) and a target cell is mediated by a coiled-coil interaction of heptad repeat sequences of the fusion protein after attachment with the host cell membrane. See, e.g., (7,8).

SUMMARY OF THE INVENTION

FF-CAR constructs: In some embodiments, the present invention is directed to an expression vector which comprises a nucleic acid sequence encoding a chimeric antigen receptor that contains a fusion protein or a fusion fragment thereof of an enveloped virus as its binding domain instead of an antibody sequence or a CD4 sequence. In some embodiments, the fusion protein is a Class I fusion protein. In some embodiments, the fusion fragment is part of the fusion protein that forms a coiled-coil structural motif during membrane fusion between the enveloped virus and its host cell. In some embodiments, the fusion fragment comprises or consists of a sequence having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to all or a portion of SEQ ID NO: 2, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, SEQ ID NO: 42, SEQ ID NO: 43, SEQ ID NO: 44, or SEQ ID NO: 45. In some embodiments, the sequence identity is over a comparison window comprising 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of the amino acid residues forming the C-terminal or N-terminal stem of the hairpin of the fusion protein of the enveloped virus. In some embodiments, the fusion fragment comprises or consists of 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to all or a portion of SEQ ID NO: 2, SEQ ID NO: 22, SEQ ID NO: 23, SEQ ID NO: 24, SEQ ID NO: 26, SEQ ID NO: 27, SEQ ID NO: 29, SEQ ID NO: 30, SEQ ID NO: 32, SEQ ID NO: 33, SEQ ID NO: 35, SEQ ID NO: 36, SEQ ID NO: 38, SEQ ID NO: 39, SEQ ID NO: 41, SEQ ID NO: 42, SEQ ID NO: 44, or SEQ ID NO: 45. In some embodiments, the fusion fragment comprises 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NO: 2, SEQ ID NO: 23, or SEQ ID NO: 24. In some embodiments, the fusion fragment comprises 35, 36, 37, 38, 39, 40, 41, 42, 43, 44, 45, or 46 consecutive amino acid residues of SEQ ID NO: 2, SEQ ID NO: 23, or SEQ ID NO: 24. In some embodiments, the fusion fragment comprises 75%, 76%, 77%, 78%, 79%, 80%, 81%, 82%, 83%, 84%, 85%, 86%, 87%, 88%, 89%0, 90%, 91%, 92%, 93%, 94%, 95%, 96%, 97%, 98%, 99%, or 100% sequence identity to 35, 36, 37, 38, 39, 40, 41, 42, 43, 44, 45, or 46 consecutive amino acid residues of SEQ ID NO: 2, SEQ ID NO: 23, or SEQ ID NO: 24. In some embodiments, the fusion fragment consists of SEQ ID NO: 2, SEQ ID NO: 23, or SEQ ID NO: 24. In some embodiments, the enveloped virus is a retrovirus. In some embodiments, the enveloped virus is an immunodeficiency virus.

In some embodiments, the present invention is directed to a cell, or progeny thereof, which said cell comprises an FF-CAR construct as described herein. In some embodiments, the fusion fragment consists of SEQ ID NO: 2, SEQ ID NO: 23, or SEQ ID NO: 24. In some embodiments, the cell or progeny thereof is a B cell, a T cell, a natural killer T cell, a hematopoietic stem cell, or a hematopoietic progenitor cell. In some embodiments, the cell or progeny thereof expresses a chimeric antigen receptor encoded by the FF-CAR construct. In some embodiments, the enveloped virus is a retrovirus. In some embodiments, the enveloped virus is an immunodeficiency virus.

In some embodiments, the present invention is directed to a method of treating, reducing, or inhibiting an infection by the enveloped virus in a subject, which comprises transplanting one or more cells that contain an FF-CAR construct as described herein and/or one or more cells that express an FF-CAR as described herein. In some embodiments, the enveloped virus is a retrovirus. In some embodiments, the enveloped virus is an immunodeficiency virus. In some embodiments, the subject is human.

In some embodiments, the present invention is directed to a method of killing an infected cell infected with the enveloped virus, which comprises contacting the infected cell with one or more cells that contain an FF-CAR construct as described herein and/or one or more cells that express an FF-CAR as described herein. In some embodiments, the enveloped virus is a retrovirus. In some embodiments, the enveloped virus is an immunodeficiency virus. In some embodiments, the subject is human.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description explain the principles of the invention.

DESCRIPTION OF THE DRAWINGS

This invention is further understood by reference to the drawings wherein:

FIG. 2 is a modification of FIG. 2 of Sanders, et al. (9).

DETAILED DESCRIPTION OF THE INVENTION

Figure 1:
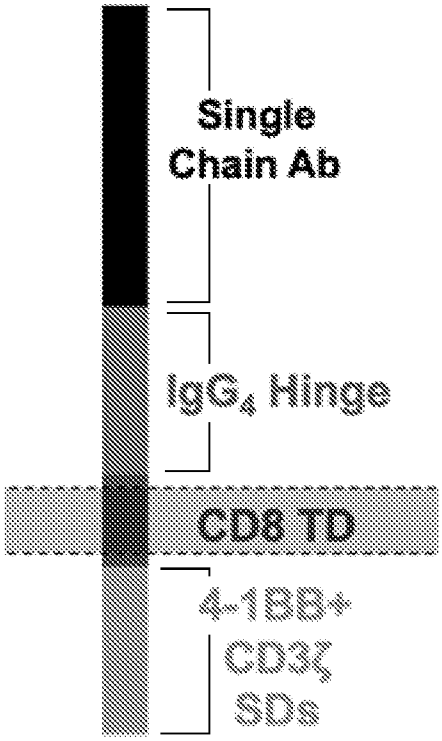
FIG. 1 schematically shows a CAR comprising a single chain antibody. A single chain antibody serves as the binding domain, anchored to the cell membrane by an immunoglobulin spacer (hinge) domain and the CD8 transmembrane domain, linked to a signaling domain.
Figure 2:
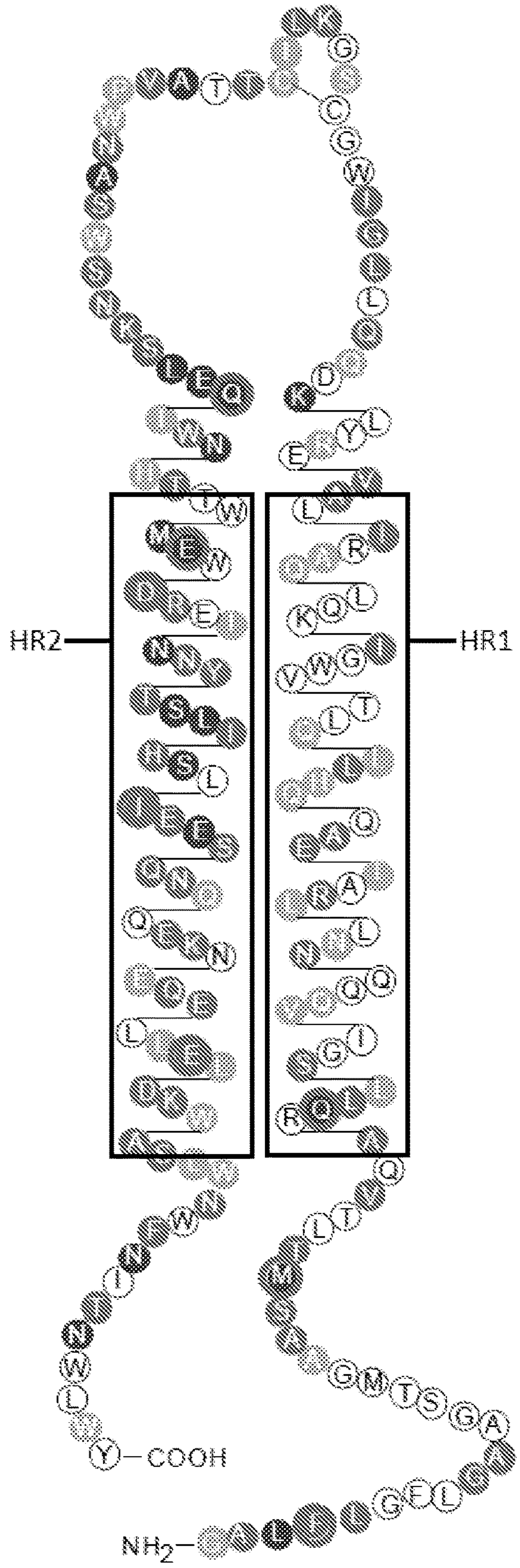
FIG. 2 schematically shows the amino acid sequence (SEQ ID NO: 22) forming the hairpin structure of Env gp41 for HIV-1 strain HXB2. The interaction of the two heptad repeats, HR1 (SEQ ID NO: 23) and HR2 (SEQ ID NO: 24), brings the virus and target cell membranes together for membrane fusion.
Figure 3:
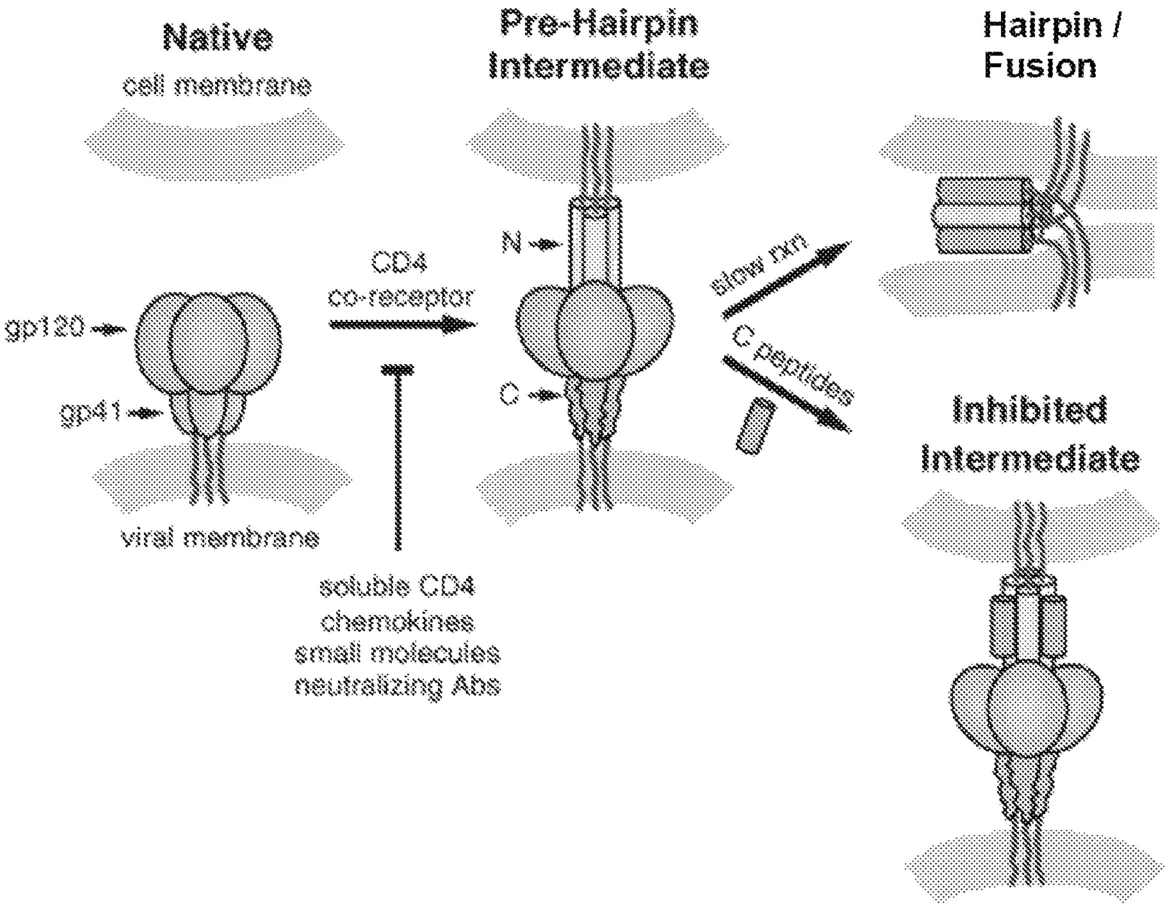
FIG. 3 is a model of HIV envelope fusion (adapted from Chan and Kim (10)), that shows the HIV receptor induced membrane fusion by formation of a coiled-coil via the heptad repeats and the inhibited intermediate with the use of C-peptide (HR2) as competitive inhibitor.

The present invention provides fusion fragment chimeric antigen receptors (FF-CARs) and engineered cells expressing FF-CARs. As disclosed herein, an "FF-CAR" is a chimeric antigen receptor (CAR) that contains a fusion protein or a fusion fragment as its binding domain instead of an antibody binding sequence, e.g., a single chain antibody, or a CD4 extracellular domain. That is, FF-CARs according to the present invention do not contain any antibody binding sequence or one or more CD4 extracellular domains as their binding domain.

As used herein, a "fusion protein" refers to a polypeptide that enables the fusion between an enveloped virus and its host cell. As used herein, "fusion fragment" and "fusion protein fragment" are used interchangeably to refer to at least the portion of a fusion protein that is required for fusion between the envelope of a given virus and the membrane of its host cell. That is, a fusion fragment comprises at least the minimum sequence of the fusion protein required for fusion activity and can include the full-length sequence of the fusion protein. As used herein, an "enveloped virus" refers to a virus that contains a viral envelope. Examples of enveloped viruses include herpesviruses (e.g., *Herpes simplex* virus 1 (HSV-1), *Herpes simplex* virus 2 (HSV-2), *Varicella zoster* virus, Epstein-Barr virus, and Cytomegalovirus spp.), poxviruses (e.g., Orthopoxvirus spp., Parapoxvirus spp., Vatapoxvirus spp., and Molluscipoxvirus spp.), hepadnaviruses (e.g., Hepatitis B virus), flaviviruses (e.g., West Nile virus, Dengue virus, Tick-borne encephalitis virus, Yellow fever virus, Zika virus), togaviruses (e.g., Rubella virus), coronaviruses (e.g., SARS coronavirus), orthomyxoviruses (e.g., Influenza virus A, Influenza virus B, Influenza virus C, and Influenza virus D), paramyxoviruses (e.g., Respiratory syncytial virus, Mumps rubulavirus, Measles morbillivirus, and Human parainfluenza virus spp.), rhabdoviruses (e.g., Lyssavirus spp., Vesiculovirus spp., and Cytorhabdovirus spp.), bunyaviruses (e.g., Hantavirus spp. and Rift Valley fever virus), filoviruses (e.g., Ebolavirus spp. and Marburg virus), and retroviruses (e.g., Human T-cell leukemia-lymphoma virus, Human immunodeficiency virus 1 (HIV-1), Human immunodeficiency virus 2 (HIV-2), and Simian immunodeficiency virus (SIV)). As used herein, "HIV" refers to HIV-1 and/or HIV-2 unless the context clearly dictates otherwise. As used herein, an "immunodeficiency virus" refers to HIV and/or SIV.

Examples of fusion proteins include Env proteins of Retroviridae family viruses, HA proteins of Orthomyxoviridae family viruses, F proteins of Paramyxoviridae family viruses, S proteins of Coronaviridae family viruses, GP proteins of Filoviridae family viruses, GP proteins of Arenaviridae family viruses, E1 proteins of Togaviridae family viruses, E proteins of Flaviviridae family viruses, $G_c$ proteins of Bunyaviridae family viruses, G proteins of Rhabdoviridae family viruses, gB proteins of Herpesviridae family viruses, and S proteins of Hepadnaviridae family viruses. In some embodiments, the fusion fragment of an FF-CAR according to the present invention is a Class I fusion protein or a fragment thereof. In some embodiments, the fusion fragment of an FF-CAR according to the present invention is an Env protein of a Retroviridae family virus, an HA protein of a Orthomyxoviridae family virus, an F protein of a Paramyxoviridae family virus, an S protein of a Coronaviridae family virus, a GP protein of a Filoviridae family virus, or a GP protein of an Arenaviridae family virus, or a fragment thereof. In some embodiments, the fusion fragment of an FF-CAR according to the present invention is an Env protein or fragment thereof of HIV-1 or HIV-2. In some embodiments, the fusion fragment is a "coil peptide", which refers to a sequence of a fusion protein that forms a part of a coiled-coil structural motif that occurs during membrane fusion between an enveloped virus and its host cell. Some specific examples of fusion proteins include SEQ ID NO: 21, SEQ ID NO: 25, SEQ ID NO: 28, SEQ ID NO: 31, SEQ ID NO: 34, SEQ ID NO: 37, SEQ ID NO: 40, and SEQ ID NO: 43.

Examples of fusion fragments include C46 (SEQ ID NO: 2, an inhibitor of HIV fusion), SEQ ID NO: 22, SEQ ID NO: 23, SEQ ID NO: 24, SEQ ID NO: 26, SEQ ID NO: 27, SEQ ID NO: 29, SEQ ID NO: 30, SEQ ID NO: 32, SEQ ID NO: 33, SEQ ID NO: 35, SEQ ID NO: 36, SEQ ID NO: 38, SEQ ID NO: 39, SEQ ID NO: 41, SEQ ID NO: 42, SEQ ID NO: 44, and SEQ ID NO: 45. See, e.g., (11,12). A fusion fragment of a fusion protein can be readily determined in the art, e.g., by sequence analysis and/or site-directed mutational analysis. See, e.g., (4).

C46-CARs are exemplified in the experiments herein. As used herein, a "C46-CAR" refers to an FF-CAR that contains at least 35 amino acid residues of SEQ ID NO: 2. as the binding domain. In some embodiments, a C46-CAR contains at least 40 amino acid residues of SEQ ID NO: 2 as the binding domain. In some embodiments, a C46-CAR comprises or consists of SEQ ID NO: 24 as the binding domain.

As used herein, a "CAR construct" refers to an expression vector that is capable of expressing a given CAR in a cell when contained therein. As used herein, an "FF-CAR construct" refers to an expression vector that is capable of expressing a given FF-CAR in a cell when contained therein. As used herein, an "C46-CAR construct" refers to an expression vector that is capable of expressing a given C46-CAR in a cell when contained therein.

Figure 10:
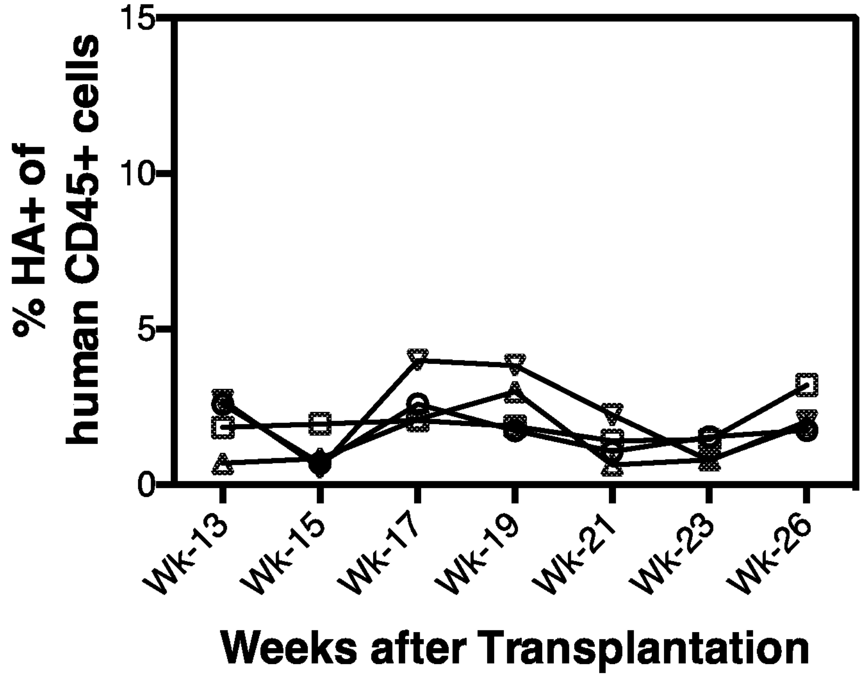
FIG. 10 shows levels of cells expressing C46-CARs (as indicated by the reporter HA) as a percentage of total human lymphocytes (CD45+) in the peripheral blood of human immune-reconstituted mice (human fetal bone marrow, liver, thymus transplanted immunodeficient mice) after engraftment of hematopoietic stem cells transduced with the C46-CAR construct. The mice were infected with HIV at week 16, and the graph shows a boost of the cells expressing C46-CAR after infection. Each symbol represents one mouse.
Figure 11:
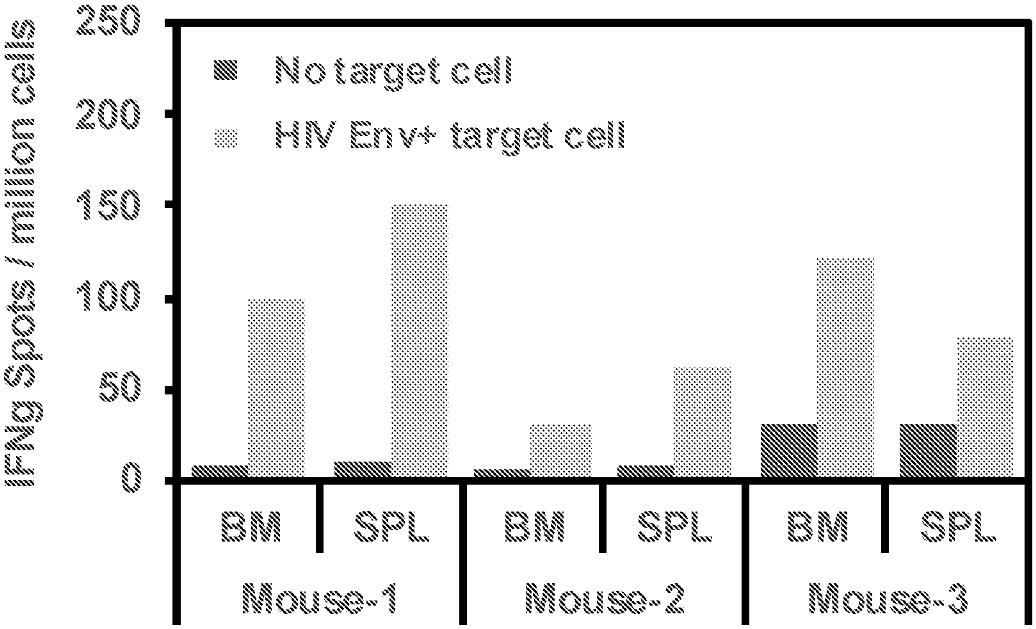
FIG. 11 shows the functionality of cells that express C46-CAR in the bone marrow (BM) and spleen (SPL) of the mice treated with the hematopoietic stem cells transduced with the C46-CAR construct as described in FIG. 10. The cells were isolated and tested for response to HIV Envelope-expressing cells (Jurkat-HXBc2) using detection of interferon gamma by Enzyme Linked Immune Spot assay.

As disclosed herein, T cells comprising C46-CAR constructs (1) protect the cells from HIV infection, and (2) target HIV infected cells for specific killing. It is also expected that T cells comprising C46-CAR constructs will exhibit antiviral activity. As shown in an in vivo model of HIV infection, the CAR-transduced T cells appear to expand in response to viral infection (FIG. 10) and have the capacity to recognize Env-expressing target cells as shown by interferon gamma release (FIG. 11).

Therefore, in some embodiments, the present invention provides a cell comprising a C46-CAR construct. In some embodiments, the cell is a lymphocyte. In some embodiments, the cell is a B cell. In some embodiments, the cell is a T cell. In some embodiments, the T cell is a killer T cell. In some embodiments, the T cell is a helper T cell. In some embodiments, the T cell is a T1 cell. In some embodiments, the T cell is a CD8+ T cell. In some embodiments, the T cell is a CD4+ T cell. In some embodiments, the T cell is a natural killer T cell. In some embodiments, the cell is an HSPC. As used herein, "HSPC" refers to a hematopoietic stem cell (HSC) and/or a hematopoietic progenitor cell (HPC). In some embodiments, the cell is a peripheral blood mononuclear cell (PBMC).

In some embodiments, the present invention provides a method of killing a cell infected with an immunodeficiency virus, such as HIV, which comprises contacting the infected cell with a T cell comprising a C46-CAR construct. In some embodiments, the T cell is a killer T cell. In some embodiments, the T cell is a helper T cell. In some embodiments, the T cell is a T1 cell. In some embodiments, the T cell is a CD8+ T cell. In some embodiments, the T cell is a CD4+ T cell. In some embodiments, the T cell is a natural killer T cell.

In some embodiments, the present invention provides a method of treating an infection by an immunodeficiency virus, such as HIV, in a subject which comprises administering to a subject a cell comprising a C46-CAR construct. In some embodiments, the cell is a B cell. In some embodiments, the cell is a T cell. In some embodiments, the T cell is a killer T cell. In some embodiments, the T cell is a helper T cell. In some embodiments, the T cell is a T1 cell. In some embodiments, the T cell is a CD8+ T cell. In some embodiments, the T cell is a CD4+ T cell. In some embodiments, the T cell is a natural killer T cell. In some embodiments, the cell is an HSPC. In some embodiments, the cell is a PBMC.

In some embodiments, the C46-CAR constructs according to the present invention encode a C46-CAR that comprises a peptide having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NO: 2 or SEQ ID NO: 24 as the binding domain. In some embodiments, the C46-CAR constructs according to the present invention encode a C46-CAR that contains a peptide having 35, 36, 37, 38, 39, 40, 41, 42, 43, 44, 45, or 46 consecutive amino acid residues of SEQ ID NO: 2 as the binding domain. In some embodiments, the C46-CAR constructs according to the present invention encode a C46-CAR that comprises a peptide having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to at least 35, 36, 37, 38, 39, 40, 41, 42, 43, 44, 45, or 46 consecutive amino acid residues of SEQ ID NO: 2 as the binding domain. In some embodiments, the spacer (hinge) region is a modified $IgG_4$ hinge sequence, e.g., has at least 90% sequence identity to SEQ ID NO: 18, a spacer (hinge) region of another immunoglobulin molecule, e.g., SEQ ID NO: 20, or a polypeptide sequence that fuses fusion protein or fusion fragment to the transmembrane domain of the FF-CAR.

Because the close interaction of the heptad repeats, i.e., HR1 and HR2, of gp41 is important to HIV membrane fusion, it is believed that an FF-CAR comprising a peptide having at least 75% sequence identity to HR1 (SEQ ID NO: 23) as its binding domain will function similarly to the C46-CARs exemplified herein. Therefore, in some embodiments, the C46-CAR constructs according to the present invention encode a C46-CAR that comprises a peptide having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NO: 23 as the binding domain. In some embodiments, the C46-CAR constructs according to the present invention encode a C46-CAR that contains a peptide having 35, 36, 37, 38, 39, 40, 41, 42, or 43 consecutive amino acid residues of SEQ ID NO: 23 as the binding domain. In some embodiments, the C46-CAR constructs according to the present invention encode a C46-CAR that comprises a peptide having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to 35, 36, 37, 38, 39, 40, 41, 42, or 43 consecutive amino acid residues of SEQ ID NO: 23 as the binding domain.

In some embodiments, the treatment method further includes administering to the subject a therapeutically effective amount of an HIV vaccine, a latency reversing agent, and/or an antiretroviral therapeutic. Examples of HIV vaccines include AIDSVAX, Modified Vaccinia Ankara B (MVA-B), ALVAC, and the like. Examples of latency reversing agents include byrostatin, histone deacetylase inhibitors (e.g., vorinostat, panobinostat, romidepsin, etc.), toll-like receptor 7 (TLR7) agonists (e.g., GS-9620), and the like. Examples of antiretroviral therapeutics include Abacavir (Ziagen), Atazanavir (Reyataz), Atripla (efavirenz, FTC, tenofovir), Darunavir (Prezista), Descovy (tenofovir alafenamide, emtricitabine), Dolutegravir (Tivicay), Efavirenz (Sustiva), Elvitegravir (Vitekta), Emtricitabine (FTC, Emtriva), Etravirine (Intelence), Eviplera (rilpivirine, emtricitabine, and tenofovir), Evotaz (atazanavir and cobicistat), Fosamprenavir (Telzir), Genvoya (elvitegravir, cobicistat, emtricitabine, tenofovir alafenamide (TAF)), Kivexa (abacavir/3TC), Kivexa (lamivudine, abacavir), Lamivudine (3TC, Epivir), Kaletra (lopinavir, ritonavir), Maraviroc (Celsentri), Nevirapine (Viramune), Odefsey (rilpivirine, emtricitabine, tenofovir alafenamide (TAF)), Raltegravir (Isentress), Rezolsta (darunavir, cobicistat), Rilpivirine (Edurant), Ritonavir (Norvir), Stribild (elvitegravir, emtricitabine, tenofovir disoproxil, cobicistat), Tenofovir (Viread), Triumeq (dolutegravir, abacavir, lamivudine), Truvada (tenofovir, FTC), Zidovudine (AZT, Retrovir), and the like.

Because all fusion proteins are trimers of hairpins in their final forms, it is believed that an FF-CAR construct encoding a fusion fragment comprising at least 75% sequence identity to the C-terminal or N-terminal portion that forms the stem of the hairpin of the fusion protein of a given enveloped virus, will protect the cells against infection by the given enveloped virus and result in targeted killing of cells infected by the given enveloped virus. In fact, as shown in FIG. 10 and FIG. 11, cells expressing FF-CARs proliferate upon encountering their target antigen and exhibit an effector response thereto in vivo.

Therefore, in some embodiments, the present invention provides a cell comprising an FF-CAR construct that encodes a CAR having a fusion fragment of a given enveloped virus as the binding domain of the CAR. In some embodiments, the given enveloped virus is HIV, SIV, HTLV-1, Respiratory syncytial virus, MMLV, Ebola, or Simian parainfluenza virus 5 (SV5). In some embodiments the fusion fragment comprises or consists of a peptide having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NO: 2, SEQ ID NO: 22, SEQ ID NO: 23, SEQ ID NO: 24, SEQ ID NO: 26, SEQ ID NO: 27, SEQ ID NO: 29, SEQ ID NO: 30, SEQ ID NO: 32, SEQ ID NO: 33, SEQ ID NO: 35, SEQ ID NO: 36, SEQ ID NO: 38, SEQ ID NO: 39, SEQ ID NO: 41, SEQ ID NO: 42, SEQ ID NO: 44, or SEQ ID NO: 45. In some embodiments, the cell is a lymphocyte. In some embodiments, the cell is a B cell. In some embodiments, the cell is a T cell. In some embodiments, the T cell is a killer T cell. In some embodiments, the T cell is a helper T cell. In some embodiments, the T cell is a T1 cell. In some embodiments, the T cell is a CD8+ T cell. In some embodiments, the T cell is a CD4+ T cell. In some embodiments, the T cell is a natural killer T cell. In some embodiments, the cell is an HSPC. In some embodiments, the cell is an HSPC. In some embodiments, the cell is a PBMC.

In some embodiments, the present invention provides a method of killing a cell infected with an enveloped virus which comprises contacting the infected cell with an T cell that contains an FF-CAR construct that encodes a CAR having a fusion fragment of a given enveloped virus as the binding domain of the CAR. In some embodiments, the given enveloped virus is HIV, SIV, HTLV-1, Respiratory syncytial virus, MMLV, Ebola, or Simian parainfluenza virus 5 (SV5). In some embodiments the fusion fragment comprises or consists of a peptide having 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NO: 2, SEQ ID NO: 22, SEQ ID NO: 23, SEQ ID NO: 24, SEQ ID NO: 26, SEQ ID NO: 27, SEQ ID NO: 29, SEQ ID NO: 30, SEQ ID NO: 32, SEQ ID NO: 33, SEQ ID NO: 35, SEQ ID NO: 36, SEQ ID NO: 38, SEQ ID NO: 39, SEQ ID NO: 41, SEQ ID NO: 42, SEQ ID NO: 44, or SEQ ID NO: 45. In some embodiments, the T cell is a killer T cell. In some embodiments, the T cell is a helper T cell. In some embodiments, the T cell is a T1 cell. In some embodiments, the T cell is a CD8+ T cell. In some embodiments, the T cell is a CD4+ T cell. In some embodiments, the T cell is a natural killer T cell.

In some embodiments, the present invention provides a method of treating an infection by an enveloped virus in a subject which comprises administering to a subject a cell comprising an FF-CAR construct that encodes a CAR having a fusion fragment of the enveloped virus as the binding domain of the CAR. In some embodiments, the given enveloped virus is HIV, SIV, HTLV-1, Respiratory syncytial virus, MMLV, Ebola, or Simian parainfluenza virus 5 (SV5). In some embodiments, the cell is a PBMC. In some embodiments the fusion fragment comprises or consists of a peptide having 75%, 76%, 77%, 78%, 79%, 80%, 81%, 82%, 83%, 84%, 85%, 86%, 87%, 88%, 89%0, 90%, 91%, 92%, 93%, 94%, 95%, 96%, 97%, 98%, 99%, or 100% sequence identity to SEQ ID NO: 2, SEQ ID NO: 22, SEQ ID NO: 23, SEQ ID NO: 24, SEQ ID NO: 26, SEQ ID NO: 27, SEQ ID NO: 29, SEQ ID NO: 30, SEQ ID NO: 32, SEQ ID NO: 33, SEQ ID NO: 35, SEQ ID NO: 36, SEQ ID NO: 38, SEQ ID NO: 39, SEQ ID NO: 41, SEQ ID NO: 42, SEQ ID NO: 44, or SEQ ID NO: 45. In some embodiments, the cell is a B cell. In some embodiments, the cell is a T cell. In some embodiments, the T cell is a killer T cell. In some embodiments, the T cell is a helper T cell. In some embodiments, the T cell is a T1 cell. In some embodiments, the T cell is a CD8+ T cell. In some embodiments, the T cell is a CD4+ T cell. In some embodiments, the T cell is a natural killer T cell. In some embodiments, the cell is an HSPC.

In some embodiments, one or more cells comprising an FF-CAR construct, such as a C46-CAR construct, are transplanted in a subject to prophylactically treat the subject against being infected with a given enveloped virus, such as HIV. For example, in some embodiments, a subject who is not infected with HIV is treated with HSPCs transduced with a C46-CAR construct. The transplanted HSPCs are allowed to differentiate and develop into mature naive T cells that express C46-CARs.

Compositions

In some embodiments, compositions according to the present invention comprise one or more cells comprising an FF-CAR construct, such as a C46-CAR construct. In some embodiments, compositions according to the present invention are pharmaceutical compositions. In some embodiments, the pharmaceutical compositions comprise a therapeutically effective amount of one or more cells comprising an FF-CAR construct, such as a C46-CAR construct. As used herein, a "pharmaceutical composition" refers to a composition suitable for pharmaceutical use in a subject. A pharmaceutical composition generally comprises an effective amount of an active agent and a pharmaceutically acceptable carrier, e.g., a buffer, adjuvant, and the like. As used herein, a "pharmaceutically acceptable carrier" refers to solvents, dispersion media, coatings, antibacterial and antifungal agents, isotonic and absorption delaying agents, and the like, that are compatible with the active ingredient and comply with the applicable standards and regulations, e.g., the pharmacopeial standards set forth in the United States Pharmacopeia and the National Formulary (USP-NF) book, for pharmaceutical administration. Thus, for example, unsterile water is excluded as a pharmaceutically acceptable carrier for, at least, intravenous administration. pharmaceutically acceptable carriers include those in the art. See, e.g., REMINGTON: THE SCIENCE AND PRACTICE OF PHARMACY. 20th ed. (2000) Lippincott Williams & Wilkins. Baltimore, MD.

As used herein, an "effective amount" refers to a dosage or amount sufficient to produce a desired result. The desired result may comprise an objective or subjective response in, for example, a treatment group as compared to a control group in, for example, an in vitro assay. In some embodiments, the effective amount is a "therapeutically effective amount". As used herein, a "therapeutically effective amount" refers to an amount sufficient to effect a beneficial or desired therapeutic (including preventative) result in a subject, such as a reduction of HIV infected cells and/or suppression of HIV viral replication, as compared to a control or a baseline measurement before treatment. therapeutically effective amount and immunogenic amounts may be administered as a single dose or as a series of several doses. As used herein, an "immunogenic amount" is an amount that is sufficient to elicit an immune response in a subject and depends on a variety of factors such as the immunogenicity of the given antigen, the manner of administration, the general state of health of the subject, and the like. The skilled artisan will appreciate that certain factors may influence the dosage required to effectively treat or immunize a subject, including the degree of symptoms, previous treatments, the general health and age of the subject, and the like. Nevertheless, effective amounts and therapeutically effective amounts may be readily determined using methods in the art.

pharmaceutical compositions of the present invention may be formulated for the intended route of delivery, including intravenous, intramuscular, intraperitoneal, subcutaneous, intraocular, intrathecal, intraarticular, intrasynovial, cisternal, intrahepatic, intralesional injection, intracranial injection, infusion, and/or inhaled routes of administration using methods in the art. pharmaceutical compositions according to the present invention may include one or more of the following: pH buffered solutions, adjuvants (e.g., preservatives, wetting agents, emulsifying agents, and dispersing agents), liposomal formulations, nanoparticles, dispersions, suspensions or emulsions as well as sterile powders for reconstitution into sterile injectable solutions or dispersions. The compositions and formulations of the present invention may be optimized for increased stability and efficacy using methods in the art.

Dosages and Regimen pharmaceutical compositions of the present invention may be provided in dosage unit forms. As used herein, "dosage unit form" refers to physically discrete units suited as unitary dosages for the subject to be treated; each unit containing a predetermined quantity of an active ingredient calculated to produce the desired therapeutic effect in association with the required pharmaceutically acceptable carrier. The specification for the dosage unit forms of the invention are dictated by the unique characteristics of the active ingredient and the particular therapeutic effect to be achieved, and the limitations inherent in the art of compounding such an active ingredient for the treatment of individuals.

Toxicity and therapeutic efficacy of the compositions according to the present invention can be determined by standard pharmaceutical procedures in cell cultures or experimental animals. For example, one may determine the lethal dose, $LC_{50}$ (the dose expressed as concentration× exposure time that is lethal to 50% of the population) or the $LD_{50}$ (the dose lethal to 50% of the population), and the $ED_{50}$ (the dose therapeutically effective in 50% of the population) by methods in the art. The dose ratio between toxic and therapeutic effects is the therapeutic index and it can be expressed as the ratio $LD_{50}/ED_{50}$. Compositions that exhibit large therapeutic indices are preferred. While compositions that exhibit toxic side effects may be used, care should be taken to use a delivery system that targets such compositions to the site of affected tissue in order to reduce side effects.

The data obtained from the cell culture assays and animal studies can be used in formulating a range of dosages for various combinations of one or more compositions of the present invention for use in humans. The dosages are preferably within a range of circulating concentrations that include the $ED_{50}$ with little or no toxicity. The dosage may vary within this range depending upon the dosage form employed and the route of administration utilized. A therapeutically effective dose can be estimated from cell culture assays. A dose may be formulated in animal models to achieve a circulating plasma concentration range that includes the $IC_{50}$ (i.e., the concentration of the test composition which achieves a half-maximal inhibition of symptoms) as determined in cell culture. Such information can be used to more accurately determine useful doses in humans. Levels in plasma may be measured using methods in the art.

Additionally, a suitable dosage for a given subject can be determined by an attending physician or another qualified medical personnel, based on various clinical factors. As is well known in the medical arts, dosages for any one subject depend upon many factors, including the subject's size, body surface area, age, the therapeutic to be administered, sex of the subject, time, and route of administration, general health, and other drugs being administered concurrently. Those of skilled in the art will readily appreciate that dose levels can vary as a function of the specific composition, e.g., the specific therapeutic being administered, the severity of the symptoms and the susceptibility of the subject to side effects. Nevertheless, preferred dosages may be readily determined by those of skill in the art.

Materials and Methods

Reagents

R10 medium: RPMI 1640 (Lonza, Allendale, NJ) supplemented with 2 mM L-glutamine (Mediatech, Manassas, VA), 100 U/ml penicillin (Mediatech, Manassas, VA), 100 U/ml streptomycin (Mediatech, Manassas, VA), 10 mM HEPES (Sigma, St. Louis, MO), and 10% heat-inactivated fetal bovine serum (FBS) (Sigma, St. Louis, MO).

R10-50 culture medium: Complete R10 culture medium, and additionally supplemented with 50 U/ml recombinant human interleukin-2 (NIH AIDS Reagent Repository, Germantown, MD).

C46-CAR Constructs

Figure 6:
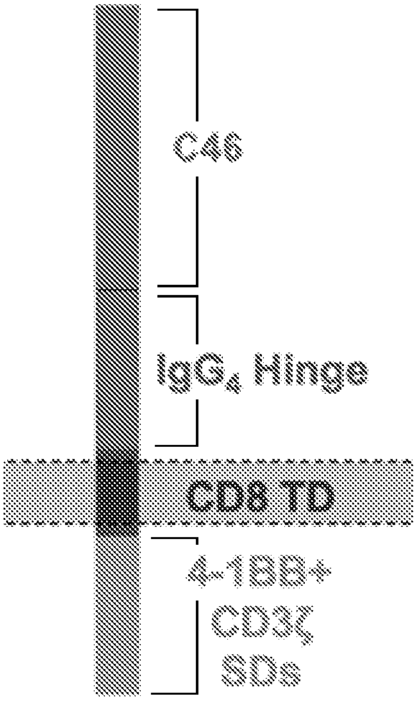
FIG. 6 schematically shows an FF-CAR comprising a fusion fragment, C46 (SEQ ID NO: 2), based on a heptad repeat from Env gp41. The FF-CAR comprises an IgG4 hinge (SEQ ID NO: 4).
Figure 7:
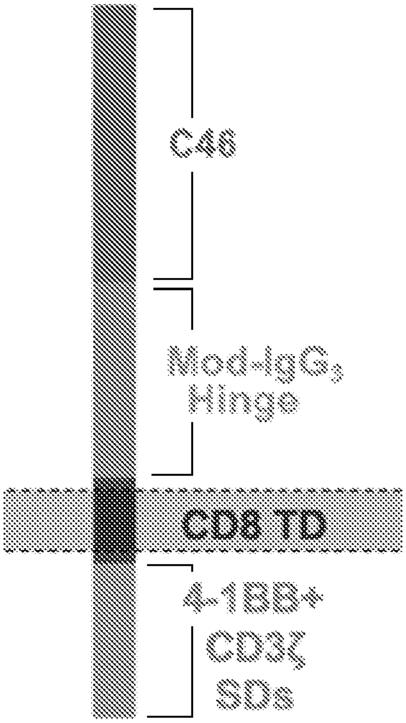
FIG. 7 schematically shows an FF-CAR comprising a fusion fragment, C46 (SEQ ID NO: 2), based on the heptad repeats from Env gp41. The FF-CAR comprises a modified $IgG_3$-hinge (Mod-$IgG_3$ Hinge, SEQ ID NO: 6) instead of an $IgG_4$ hinge.

Exemplified herein are two C46-CARs, which are schematically shown in FIG. 6 and FIG. 7.

Figures 8, 9:
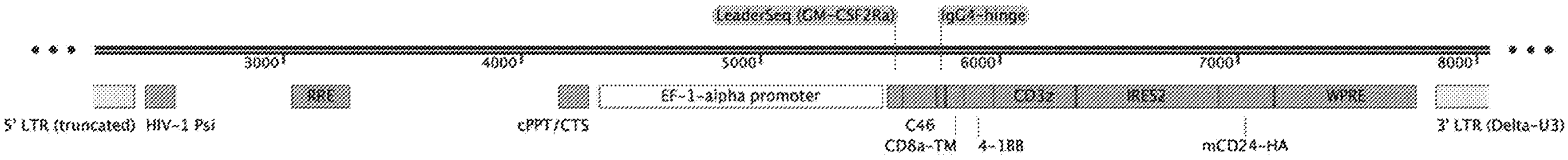
FIG. 8 shows the amino acid sequence of the modified $IgG_3$ Hinge (SEQ ID NO: 6) compared to the amino acid sequences of the $IgG_1$ Hinge (SEQ ID NO: 8), $IgG_3$ Hinge (SEQ ID NO: 7), and $IgG_4$ Hinge (SEQ ID NO: 4).
FIG. 9 schematically shows the C46-CAR construct that encodes the C46-CAR according to FIG. 6.

The coding sequences of these two C46-CARs were each engineered into the pTRPE-cMET-BBζ lentiviral vector backbone, which was generously provided as a gift by Carl H. June, from University of Pennsylvania, Philadelphia, PA. The Elongation Factor-1 alpha (EF1a) promotor was used to drive expression of the given C46-CAR. FIG. 9 schematically shows the expression cassette of the C46-CAR according to FIG. 6. The expression cassettes comprise the coding sequences for C46 fused to downstream elements that include the human $IgG_4$-hinge or modified $IgG_3$-hinge, the human CD8 transmembrane region, the cytoplasmic signaling domain of human 4-1BB (CD137), and the signaling domain of human CD3ζ chain (CD247). The expression cassettes also included a mouse CD24-HA reporter unit, mCD24-HA (an anti-mouse CD24 antibody binding epitope mutated to an anti-hemagglutinin antibody binding epitope).

C46-CAR Sequences

The nucleotide sequence encoding C46 is set forth as SEQ ID NO: 1: SEQ ID NO: 1:

```
SEQ ID NO: 1:
TGGATGGAATGGGACCGCGAGATCAACAACTACACCAGCCTGATCCACA

GCCTGATCGAGGAAAGCCAGAACCAGCAGGAAAAGAACGAGCAGGAACT

GCTGGAACTGGACAAGTGGGCCAGCCTGTGGAACTGGTTC
```

The amino acid sequence of C46 is set forth as SEQ ID NO: 2:

```
SEQ ID NO: 2:
WMEWDREINNYTSLIHSLIEESQNQQEKNEQELLELDKWASLWNWE
```

The nucleotide sequence encoding the hinge from human $IgG_4$ is set forth as SEQ ID NO: 3:

```
SEQ ID NO: 3:
TCTAAGTACGGCCCTCCCTGCCCCAGCTGCCCT
```

The amino acid sequence of the hinge from human $IgG_4$ is set forth as SEQ ID NO: 4:

```
SEQ ID NO: 4:
SKYGPPCPSCP
```

The nucleotide sequence encoding the (modified) hinge from human $IgG_3$ is set forth as SEQ ID NO: 5:

```
SEQ ID NO: 5:
GAGCTCAAGACCCCTCTGGGCGACACAACCCACACAAGCCCTAGAAGCC

CTGAGCCTAAGAGCAGCGATACCCCTCCACCTTCTCCAAGATCTCCCGA

GCCTAAGTCTAGCGACACCCCACCTCCAAGTCCACGCAGCCCAGAGCCA

AAAAGCTCCGACACACCTCCTCCATGTCCTAGATGTCCTGCTCCTGAAC

TG
```

The amino acid sequence of the modified hinge from human $IgG_3$ is set forth as SEQ ID NO: 6:

```
SEQ ID NO: 6:
ELKTPLGDTTHTSPRSPEPKSSDTPPPSPRSPEPKSSDTPPPSPRSPEP
KSSDTPPPCPRCPAPEL
```

The amino acid sequence of the hinge from human $IgG_3$ is set forth as SEQ ID NO: 7:

```
SEQ ID NO: 7:
ELKTPLGDTTHTCPRCPEPKSCDTPPPCPRCPEPKSCDTPPPCPRCPEP
KSCDTPPPCPRCPAPEL
```

The amino acid sequence of the hinge from human $IgG_1$ is set forth as SEQ ID NO: 8:

```
SEQ ID NO: 8:
EPKSCDKTHTCPPCPAPEL
```

The nucleotide sequence encoding the transmembrane domain from human CD8a is set forth as SEQ ID NO: 9:

```
SEQ ID NO: 9:
GATATCTACATCTGGGCGCCCTTGGCCGGGACTTGTGGGGTCCTTCTCC
TGTCACTGGTTATCACCCTTTACTGC
```

The amino acid sequence of the transmembrane domain from human CD8a is set forth as SEQ ID NO: 10:

```
SEQ ID NO: 10:
DIYIWAPLAGTCGVLLLSLVITLYC
```

The nucleotide sequence encoding the cytoplasmic signaling domain of 4-1BB is set forth as SEQ ID NO: 11:

```
SEQ ID NO: 11:
AAACGGGGCAGAAAGAAACTCCTGTATATATTCAAACAACCATTTATGA

GACCAGTACAAACTACTCAAGAGGAAGATGGCTGTAGCTGCCGATTTCC

AGAAGAAGAAGAAGGAGGATGTGAACTG
```

The amino acid sequence of cytoplasmic signaling domain of 4-1BB is set forth as SEQ ID NO: 12:

```
SEQ ID NO: 12:
KRGRKKLLYIFKQPFMRPVQTTQEEDGCSCRFPEEEEGGCEL
```

The nucleotide sequence encoding the cytoplasmic signaling domain of the CD3ζ chain is set forth as SEQ ID NO: 13:

SEQ ID NO: 13:
AGAGTGAAGTTCAGCAGGAGCGCAGACGCCCCCGCGTACAAGCAGGGCC

AGAACCAGCTCTATAACGAGCTCAATCTAGGACGAAGAGAGGAGTACGA

TGTTTTGGACAAGAGACGTGGCCGGGACCCTGAGATGGGGGGAAAGCCG

AGAAGGAAGAACCCTCAGGAAGGCCTGTACAATGAACTGCAGAAAGATA

AGATGGCGGAGGCCTACAGTGAGATTGGGATGAAAGGCGAGCGCCGGAG

GGGCAAGGGGCACGATGGCCTTTACCAGGGTCTCAGTACAGCCACCAAG

GACACCTACGACGCCCTTCACATGCAGGCCCTGCCCCCTCGCTAA

The amino acid sequence of the cytoplasmic signaling domain of the CD3ζ chain is set forth as SEQ ID NO: 14:

SEQ ID NO: 14:
RVKFSRSADAPAYKQGQNQLYNELNLGRREEYDVLDKRRGRDPEMGGKP

RRKNPQEGLYNELQKDKMAEAYSEIGMKGERRRGKGHDGLYQGLSTATK

DTYDALHMQALPPR

The nucleotide sequence encoding the leader sequence from GM-CSF2RA is set forth as SEQ ID NO: 15:

SEQ ID NO: 15:
ATGCTGCTGCTGGTGACAAGCCTGCTGCTGTGCGAGCTGCCCCACCCCG
CCTTTCTGCTGATCCCC

The amino acid sequence of the leader sequence from GM-CSF2RA is set forth as SEQ ID NO 16

SEQ ID NO: 16:
MLLLVTSLLLCELPHPAFLLIP

The nucleotide sequence of the C46-CAR construct with the human $IgG_4$ hinge is set forth as SEQ ID NO: 17:

SEQ ID NO: 17:
ATGCTGCTGCTGGTGACAAGCCTGCTGCTGTGCGAGCTGCCCCACCCCG

CCTTTCTGCTGATCCCCTGGATGGAATGGGACCGCGAGATCAACAACTA

CACCAGCCTGATCCACAGCCTGATCGAGGAAAGCCAGAACCAGCAGGAA

AAGAACGAGCAGGAACTGCTGGAACTGGACAAGTGGGCCAGCCTGTGGA

ACTGGTTCAGAAGCTCTAAGTACGGCCCTCCCTGCCCCAGCTGCCCTGG

CGATATCTACATCTGGGCGCCCTTGGCCGGGACTTGTGGGGTCCTTCTC

CTGTCACTGGTTATCACCCTTTACTGCAAACGGGGCAGAAAGAAACTCC

TGTATATATTCAAACAACCATTTATGAGACCAGTACAAACTACTCAAGA

GGAAGATGGCTGTAGCTGCCGATTTCCAGAAGAAGAAGAAGGAGGATGT

GAACTGAGAGTGAAGTTCAGCAGGAGCGCAGACGCCCCCGCGTACAAGC

AGGGCCAGAACCAGCTCTATAACGAGCTCAATCTAGGACGAAGAGAGGA

GTACGATGTTTTGGACAAGAGACGTGGCCGGGACCCTGAGATGGGGGGA

AAGCCGAGAAGGAAGAACCCTCAGGAAGGCCTGTACAATGAACTGCAGA

AAGATAAGATGGCGGAGGCCTACAGTGAGATTGGGATGAAAGGCGAGCG

-continued

CCGGAGGGGCAAGGGGCACGATGGCCTTTACCAGGGTCTCAGTACAGCC

ACCAAGGACACCTACGACGCCCTTCACATGCAGGCCCTGCCCCCTCGCT

AA

The amino acid sequence of the C46-CAR with the human $IgG_4$ hinge is set forth as SEQ ID NO: 18:

SEQ ID NO: 18:
MLLLVTSLLLCELPHPAFLLIPWMEWDREINNYTSLIHSLIEESQNQQE

KNEQELLELDKWASLWNWERSSKYGPPCPSCPGDIYIWAPLAGTCGVLL

LSLVITLYCKRGRKKLLYIFKQPFMRPVQTTQEEDGCSCRFPEEEEGGC

ELRVKESRSADAPAYKQGQNQLYNELNLGRREEYDVLDKRRGRDPEMGG

KPRRKNPQEGLYNELQKDKMAEAYSEIGMKGERRRGKGHDGLYQGLSTA

TKDTYDALHMQALPPR

The nucleotide sequence of the C46-CAR construct with the modified human-$IgG_3$ hinge is set forth as SEQ ID NO: 19:

SEQ ID NO: 19:
ATGCTGCTGCTGGTGACAAGCCTGCTGCTGTGCGAGCTGCCCCACCCCG

CCTTTCTGCTGATCCCCTGGATGGAATGGGACCGCGAGATCAACAACTA

CACCAGCCTGATCCACAGCCTGATCGAGGAAAGCCAGAACCAGCAGGAA

AAGAACGAGCAGGAACTGCTGGAACTGGACAAGTGGGCCAGCCTGTGGA

ACTGGTTCAGAAGCGAGCTCAAGACCCCTCTGGGCGACACAACCCACAC

AAGCCCTAGAAGCCCTGAGCCTAAGAGCAGCGATACCCCTCCACCTTCT

CCAAGATCTCCCGAGCCTAAGTCTAGCGACACCCCACCTCCAAGTCCAC

GCAGCCCAGAGCCAAAAAGCTCCGACACACCTCCTCCATGTCCTAGATG

TCCTGCTCCTGAACTGGGCGATATCTACATCTGGGCGCCCTTGGCCGGG

ACTTGTGGGGTCCTTCTCCTGTCACTGGTTATCACCCTTTACTGCAAAC

GGGGCAGAAAGAAACTCCTGTATATATTCAAACAACCATTTATGAGACC

AGTACAAACTACTCAAGAGGAAGATGGCTGTAGCTGCCGATTTCCAGAA

GAAGAAGAAGGAGGATGTGAACTGAGAGTGAAGTTCAGCAGGAGCGCAG

ACGCCCCCGCGTACAAGCAGGGCCAGAACCAGCTCTATAACGAGCTCAA

TCTAGGACGAAGAGAGGAGTACGATGTTTTGGACAAGAGACGTGGCCGG

GACCCTGAGATGGGGGGAAAGCCGAGAAGGAAGAACCCTCAGGAAGGCC

TGTACAATGAACTGCAGAAAGATAAGATGGCGGAGGCCTACAGTGAGAT

TGGGATGAAAGGCGAGCGCCGGAGGGGCAAGGGGCACGATGGCCTTTAC

CAGGGTCTCAGTACAGCCACCAAGGACACCTACGACGCCCTTCACATGC

AGGCCCTGCCCCCTCGCTAA

The amino acid sequence of the C46-CAR with the modified human-$IgG_3$ hinge is set forth as SEQ ID NO: 20:

SEQ ID NO: 20:
MLLLVTSLLLCELPHPAFLLIPWMEWDREINNYTSLIHSLIEESQNQQE

KNEQELLELDKWASLWNWERSELKTPLGDTTHTSPRSPEPKSSDTPPPS

-continued

PRSPEPKSSDTPPPSPRSPEPKSSDTPPPCPRCPAPELGDIYIWAPLAG

TCGVLLLSLVITLYCKRGRKKLLYIFKQPFMRPVQTTQEEDGCSCRFPE

EEEGGCELRVKFSRSADAPAYKQGQNQLYNELNLGRREEYDVLDKRRGR

DPEMGGKPRRKNPQEGLYNELQKDKMAEAYSEIGMKGERRRGKGHDGLY

QGLSTATKDTYDALHMQALPPR

An example of a suitable control vector that can be used in comparative experiments with a given FF-CAR encodes the same fusion fragment, hinge sequence, and transmembrane domain as the given FF-CAR, but not the signaling domain of CD3ζ. For example, for comparative experiments with a C46-CAR, a suitable control vector would encode the same C46 sequence, hinge sequence, and transmembrane domain as the C46-CAR, but not the signaling domain of CD3ζ (C46-CARΔzeta).

Lentivirus Production

Pseudotyped lentivirus was produced by co-transfection of HEK293T cells with the given C46-CAR construct (10 μg) along with packaging (pCMVDR8.2DVPR (7.5 μg)) and pseudotyping vector (VSV-G envelope expressing pHCMVG (2.5 g)) using BioT transfection reagent according to the manufacturer's recommended protocol (Bioland Scientific LLC, Paramount, CA, USA). Transfections were carried out in T75 tissue culture flasks. The supernatants were collected after 48 hours of transfection, filtered (by 0.45 m filter, ThermoFisher Scientific, Grand Island, NY, USA), and concentrated by ultracentrifugation at 26,000 rpm for 120 minutes at 4° C. to give concentrated lentivirus stocks. Aliquots of the concentrated lentivirus stocks were frozen at −80° C. for later use.

Transduction of T1 Cells

Immortalized T1 cells ($10^6$ cells) were transduced with 5 μl of concentrated lentivirus stock for 4 hours with intermitted shaking and then washed and resuspended in R10 medium and cultured at 37° C. for four days. Transduced cells were checked by flow cytometry by staining for reporter expression using anti-HA (FITC) antibody. To enrich the transduced cells for further use, the reporter expressing cells were positively selected using MACS microbead technology. Specifically, the cells were stained with anti-HA (FITC) antibody and subjected to selection using microbeads coupled with anti-FITC antibody (Miltenyi Biotec Inc, Auburn, CA, USA).

Transduction of CD8+ T Cells

Primary CD8+ T lymphocytes were transduced in RetroNectin (TaKaRa, Mountain View, CA, USA) coated 48-well tissue culture plates as recommended by the manufacturer. Briefly, an aliquot of diluted lentivirus (100 μl) was added to a RetroNectin coated well and incubated for 4 hours at 37° C. in 5% $CO_2$ incubator. As recommended, the primary CD8+ T cells were added to lentivirus containing RetroNectin coated wells and incubated at 37° C. for another 3 days in R10-50 culture medium. After 3 days, the cells were further stimulated with anti-CD3 monoclonal antibody in the presence of irradiated feeder cells (peripheral blood mononuclear cells) for a week before being checked for transduction efficiency and further enrichment of transduced cells by MACS microbead technology (Miltenyi Biotec Inc, Auburn, CA, USA).

HIV-1 Virus and Infection

A replicative competent wild type HIV-1 NL 4-3 strain containing reporter gene was used for HIV infection analysis. The reporter gene in the HIV NL 4-3 is the mouse heat stable antigen (mCD24) inserted into the HIV-1 Vpr reading frame and its expression on the infected cells facilitate to detect by flow cytometry.

Protective Efficacy of FF-CAR Constructs

The protective efficacy of the FF-CARs can be determined using methods in the art. As provided herein, the protective efficacy of the C46-CARs were assessed by equally mixing transduced T1 cells (T1 cells transduced with a C46-CAR construct) with non-transduced T1 cells (50,000 cells each) and then challenging the mixture of cells with HIV-1 NL4-3 strain at a rate of 0.2 multiplicity of infection. The challenged mixture was then cultured in 96-well U bottom plate and analyzed on Day 4 and Day 6 by flow cytometry. The percent infected cells in the mixture of transduced and non-transduced T1 cells were detected and calculated by multicolor flow cytometry staining. In brief, cells were stained with fluorescent labeled antibodies for reporter expression (FITC labeled anti-HA antibody (Miltenyi Biotec Inc, Auburn, CA, USA)) for C46-CAR construct transduction along with reporter expression (PE labeled anti-mCD24 antibody (BioLegend, San Diego, CA, USA) for HIV-1 virus infection. Cells were acquired on FACScan flow cytometry using CellQuest software (BD Biosciences, CA, USA) and the percent HIV-1 infected cells among transduced and non-transduced cells, respectively, were calculated using Flowjo software (Flowjo, LLC).

Figure 4:
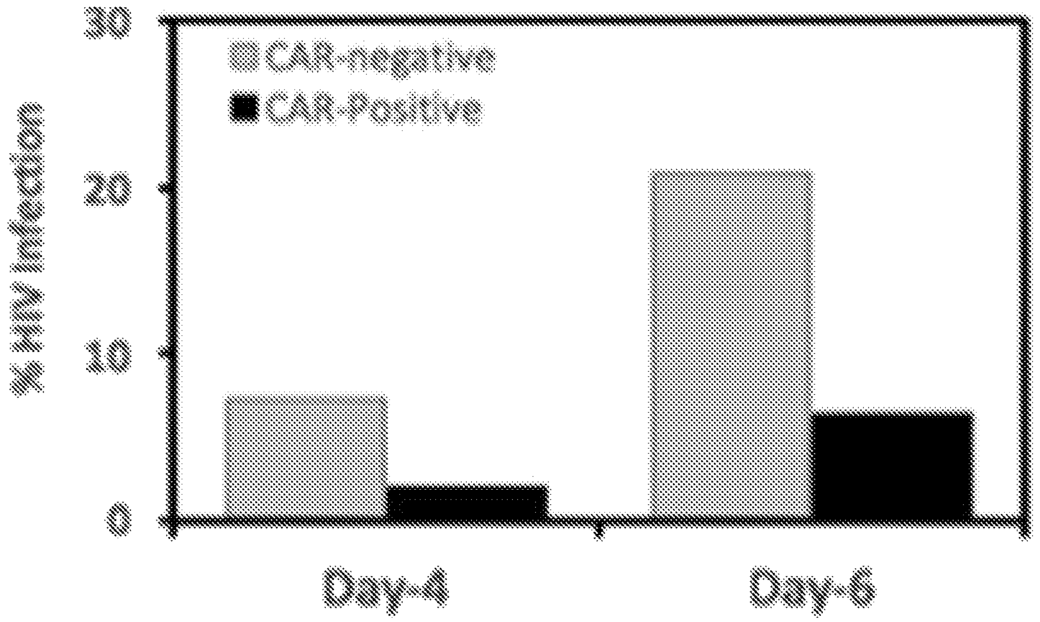
FIG. 4 summarizes the protection of cells against HIV infection by T1 cells transduced with C46-CAR constructs. T1 cells were transduced with the construct encoding the C46-CAR depicted in FIG. 6 and mixed with non-transduced T1 cells, then the mixture was challenged with HIV-1 strain NL4-3. The percentages of HIV infected cells are plotted.

As shown in FIG. 4, T1 cells transduced with a C46-CAR construct encoding SEQ ID NO: 18 protects the T1 cells against infection by HIV-1 as compared to non-transduced T1 cells. Therefore, cells transduced with an FF-CAR construct encoding a fusion fragment of an enveloped virus for the binding domain of the CAR protects the cells from being infected by the enveloped virus.

Cytotoxic Activity of CD8+ T Cells Transduced with FF-CAR Constructs

The cytotoxic activity of CD8+ T cells transduced with FF-CAR constructs can be assessed by chromium release assays in the art. See, e.g., (13). As provided herein, T1 cells infected with HIV-1 NL4-3 were used as target cells for transduced effector CD8+ T cells (CD8+ T cells transduced with a C46-CAR construct encoding SEQ ID NO: 18). The HIV infected target cells and uninfected T1 cells were $^{51}Cr$ labeled for 1 hour and incubated with or without transduced CD8+ T cells in different ratios of effector-to-target cells (E:T) at 37° C. for 4 hours in a 96-well U bottom plate. Supernatants were then harvested for measurement of extracellular $^{51}Cr$ by micro-scintillation counting in 96-well plates. Spontaneous release was measured on target cells without effector cells, and maximal release was measured on target cells lysed with 2.5% Triton X-100. Specific lysis was calculated as follows: (experimental released chromium−spontaneous release)/(maximal release−spontaneous release).

Figure 5:
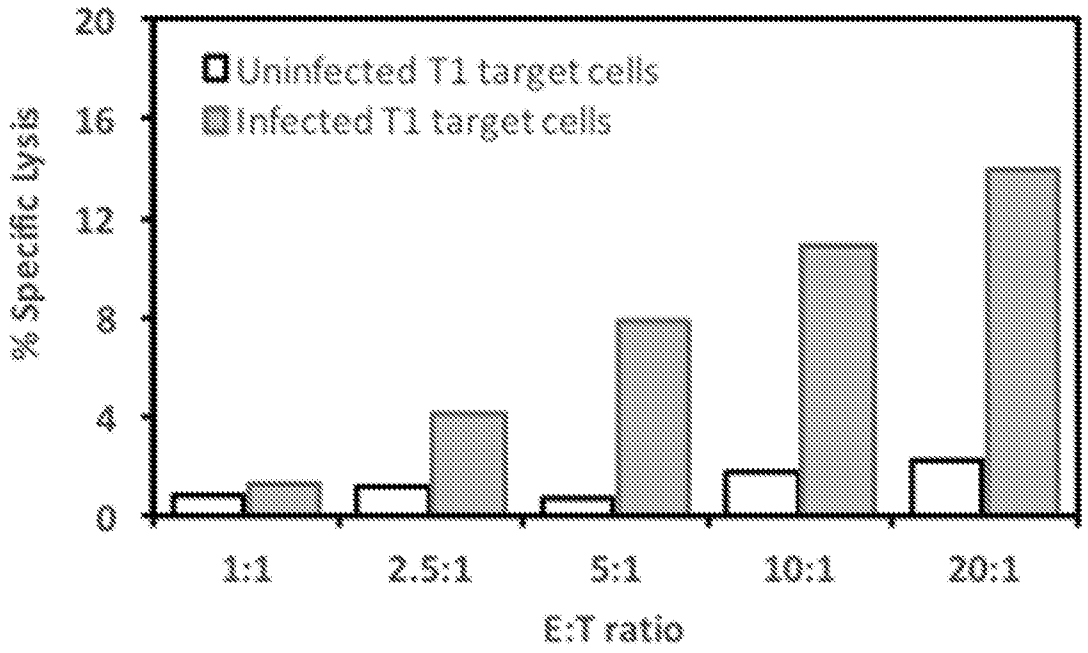
FIG. 5 summarizes the killing of HIV-infected cells by $CD8^+$ T cells transduced with C46-CAR constructs. Primary $CD8^+$ T cells transduced with the construct encoding the C46-CAR depicted in FIG. 6 were challenged with HIV-1 strain NL4-3 infected T1 cells and cytotoxicity was assessed by chromium release. Specific lysis is plotted.

Specifically, as shown in FIG. 5, CD8+ T cells transduced with C46-CAR constructs kill HIV-infected (NL4-3) target cells (T1 cells) in chromium release assays. That is, CD8+ T cells transduced with a C46-CAR construct gain HIV-specific killing as the effector-to-target (E:T) ratio is increased compared to killing of uninfected target cells.

Therefore, CD8+ T cells transduced with an FF-CAR construct encoding a fusion fragment of an enveloped virus for the binding domain of the CAR exhibit cytotoxicity against cells infected with the enveloped virus.

Antiviral Activity of CD8+ T Cells Transduced with FF-CAR Constructs

The antiviral activity of transduced CD8+ T cells (e.g., CD8+ T cells transduced with the C46-CAR constructs) can be determined using methods in the art. See, e.g., (2,14). Briefly, T1 cells are infected with HIV-1 NL4-3 at a low multiplicity of infection (0.01 moi) and then cultured in a 96-well U bottom plate along with enriched C46-CAR transduced CD8+ T cells at a E:T ratio of 1:4 (that is 12,500 effector to 50,000 target cells), along with controls, e.g., wells containing target cells without effectors. Experiments are run in triplicate and virus replication is measured by quantitative p24 ELISA (XpressBio, Frederick, MD).

It is expected that CD8+ T cells transduced with a C46-CAR construct will inhibit or reduce the viral activity of HIV-1 in infected T1 cells as compared to a control. Thus, it is also expected that CD8+ T cells transduced with an FF-CAR construct encoding a fusion fragment of an enveloped virus for the binding domain of the CAR will exhibit antiviral activity against the enveloped virus.

Additional Fusion Proteins and Fusion Fragments

The following are examples of other fusion proteins and fusion fragments that FF-CARs according to the present invention may contain as their binding domains. Solid underlines indicate sequences of N-terminal helical structures and dotted underlines indicate sequences of C-terminal helical structures.

An example of a fusion protein of Human Immunodeficiency Virus 1 (HIV-1) is UniProtKB No. P04578 (SEQ ID NO: 21):

SEQ ID NO: 21:
AVGIGALFLGFLGAAGSTMGAASMTLTVQARQLLSGIVQQQNNLLRAIE

AQQHLLQLTVWGIKQLQARILAVERYLKDQQLLGIWGCSGKLICTTAVP

WNASWSNKSLEQIWNHTTWMEWDREINNYTSLIH

SLIEESQNQQEKNEQELLELDKWASLWNWENITNWLWYIKLFIMIVGG

LVGLRIVEAVLSIVNRVRQGYSPLSFQTHLPTPRGPDRPEGIEEEGGER

DRDRSIRLVNGSLALIWDDLRSLCLESYHRLRDLLLIVTRIVELLGRRG

WEALKYWWNLLQYWSQELKNSAVSLLNATAIAVAEGTDRVIEVVQGACR

AIRHIPRRIRQGLERILL

An example of a fusion fragment of Human Immunodeficiency Virus 1 (HIV-1) is (SEQ ID NO: 22):

SEQ ID NO: 22:
GALFLGFLGAAGSTMGAASMTLTVQARQLLSGIVQQQNNLLRAIEAQQH

LLQLTVWGIKQLQARILAVERYLKDQQLLGIWGCSGKLICTTAVPWNAS

WSNKSLEQIWNHTTWMEWDREINNYTSLIHSLIEESQNQQEKNEQELLE

LDKWASLWNWENITNWLWY

SEQ ID NO: 23 is an example of an N-terminal fusion fragment and SEQ ID NO: 24 is an example of a C-terminal fusion fragment of SEQ ID NO: 21:

SEQ ID NO: 23:
ARQLLSGIVQQQNNLLRAIEAQQHLLQLTVWGIKQLQARIL

SEQ ID NO: 24:
WMEWDREINNYTSLIHSLIEESQNQQEKNEQELLELDK

An example of a fusion protein of Simian Immunodeficiency Virus (SIV) is UniProtKB No. Q87972 (SEQ ID NO: 25):

SEQ ID NO: 25:
MYTTGGTSRNKRGVFVLGFLGFLATAGSAMGAASLTLTAQSRTLLAGIV

QQQQQLLDVVKRQQELLRLTVWGTKNLQTRVTAIEKYLKDQAQLNAWGC

AFRQVCHTTVPWPNASLTPNWNNDTWQEWERKVD

FLEENITALLEEAQIQQEKNMYELQKLNSWDVEGNWEDLASWIKYIQY

GIYIVVGVILLRIVIYIVQMLAKLRQGYRPVFSSPPSYFQQTHIQQDPA

LPTREGKEGDGGESGGNSSWPWQIEYIHFLIRQLIRLLTWLESNCRTLL

SRAYQILQPILQRLSAALQRIREVLRTELTYLQYGWSYFQEAVQVGWRS

ATETLAGAWGDLWETLRRGGRWILAIPRRIRQGLELTLL

SEQ ID NO: 26 is an example of an N-terminal fusion fragment and SEQ ID NO: 27 is an example of a C-terminal fusion fragment of this fusion protein:

SEQ ID NO: 26:
RTLLAGIVQQQQQLLDVVKRQQELLRLTVWGTKNLQTRVTAIEKYLKDQ
AQ

SEQ ID NO: 27:
WNNDTWQEWERKVDFLEENITALLEEAQIQQEKNMYELQKL

An example of a fusion protein of Influenza A Virus is UniProtKB No. V5IRU3 (SEQ ID NO: 28):

SEQ ID NO: 28:
GLFGAIAGFIENGWEGLIDGWYGFRHQNAQGEGTAADYKSTQSAIDQIT

GKLNRLIEKTNQQFELIDNEFNEVEKQIGNVINWIRDSITEVWSYNAEL

LVAMENQHTIDLADSEMDKLYERVKRQLRENAEEDGTGCFEIFHKCDDD

CMASIRNNTYDHSKYREEAMQN

SEQ ID NO: 29 is an example of an N-terminal fusion fragment and SEQ ID NO: 30 is an example of a C-terminal fusion fragment of this fusion protein:

SEQ ID NO: 29:
YKSTQSAIDQITGKLNRLIEKTNQQFELIDNEFNEVEKQIGNVINWIRD
SITEVWSYNAELLVAMEN

SEQ ID NO: 30:
LADSEMDKLYERVKRQLRE

An example of a fusion protein of Ebolavirus is UniProtKB No. Q05320 (SEQ ID NO: 31):

SEQ ID NO: 31:
EAIVNAQPKCNPNLHYWTTQDEGAAIGLAWIPYFGPAAEGIYIEGLMHN

QDGLICGLRQLANETTQALQLFLRATTELRTFSILNRKAIDFLLQRWGG

TCHILGPDCCIEPHDWTKNITDKIDQIIHDFVDKTLPDQGDNDNWWTGW

RQWIPAGIGVTGVIIAVIALFCICKFVF

SEQ ID NO: 32 is an example of an N-terminal fusion fragment and SEQ ID NO: 33 is an example of a C-terminal fusion fragment of this fusion protein:

SEQ ID NO: 32:
DGLICGLRQLANETTQALQLFLRATTELRTFSILNRKAIDEL

-continued

SEQ ID NO: 33:
HDWTKNITDKIDQIIHDFVDKTLPD

An example of a fusion protein of MoMLV is UniProtKB No. P03385 (SEQ ID NO: 34):

SEQ ID NO: 34:
EPVSLTLALLLGGLTMGGIAAGIGTGTTALMATQQFQQLQAAVQDDLRE
VEKSISNLEKSLTSLSEVVLQNRRGLDLLELKEGGLCAALKEECCFYAD
HTGLVRDSMAKLRERLNQRQKLFESTQGWFEGLENRSPWFTTLISTIMG
PLIVLLMILLFGPCILNRLVQFVKDRISVVQAL

SEQ ID NO: 35 is an example of an N-terminal fusion fragment and SEQ ID NO: 36 is an example of a C-terminal fusion fragment of this fusion protein:

SEQ ID NO: 35: DLREVEKSISNLEKSLTSLSEVVLQNRRGLDLL

SEQ ID NO: 36: LCAALK

An example of a fusion protein of HTLV-1 is UniProtKB No. P03381 (SEQ ID NO: 37):

SEQ ID NO: 37:
AVPVAVWLVSALAMGAGVAGGITGSMSLASGKSLLHEVDKDISQLTQAI
VKNHKNLLKIAQYAAQNRRGLDLLFWEQGGLCKALQEQCRFPNITN
SHVPILQERPPLENRVLTGWGLNWDLGLSQWAREALQTGITLVALLLLV
ILAGPCILRQLRHLPSRVRYPHYSLIKPESSL

SEQ ID NO: 38 is an example of an N-terminal fusion fragment and SEQ ID NO: 39 is an example of a C-terminal fusion fragment of this fusion protein:

SEQ ID NO: 38: SLASGKSLLHEVDKDISQLTQAIVKNHKNLLKIAQYAAQNRRGLDLL

SEQ ID NO: 39: SHVPILQ

An example of a fusion protein of Human Respiratory Syncytial Virus-B is UniProtKB No. 036634 (SEQ ID NO: 40):

SEQ ID NO: 40:
MELLIHRLSAIFLTLAINALYLTSSQNITEEFYQSTCSAVSRGYFSALR
TGWYTSVITIELSNIKETKCNGTDTKVKLIKQELDKYKNAVTELQLLMQ
NTPAANNRARREAPQYMNYTINTTKNLNVSISKKRKRRFLGFLLGVGSA
IASGIAVSKVLHLEGEVNKIKNALLSTNKAVVSLSNGVSVLTSKVLDLK
NYINNQLLPIVNQQSCRISNIETVIEFQQKNSRLLEINREFSVNAGVTT
PLSTYMLTNSELLSLINDMPITNDQKKLMSSNVQIVRQQSYSIMSIIKE
EVLAYVVQLPIYGVIDTPCWKLHTSPLCTTNIKEGSNICLTRTDRGWYC
DNAGSVSFFPQADTCKVQSNRVFCDTMNSLTLPSEVSLCNTDIFNSKYD
CKIMTSKTDISSSVITSLGAIVSCYGKTKCTASNKNRGIIKTFSNGCDY
VSNKGVDTVSVGNTLYYVNKLEGKNLYVKGEPII
NYYDPLVFPSDEFDASISQVNEKINQSLAFIRRSDELLHNVNTGKSTTN
IMITTIIIVIIVVLLSLIAIGLLLYCKAKNTPVTLSKDQLSGINNIAFS
K

SEQ ID NO: 41 is an example of an N-terminal fusion fragment and SEQ ID NO: 42 is an example of a C-terminal fusion fragment of this fusion protein:

SEQ ID NO: 41:
AVSKVLHLEGEVNKIKNALLSTNKAVVSLSNGVSVLTSKVLDLKNYINN
QLLPIVNQ

SEQ ID NO: 42:
NYYDPLVFPSDEFDASISQVNEKINQSLAFIRRSDELLHNVNTGKSTTN

An example of a fusion protein of Parainfluenza virus 5 (PIV5) is UniProtKB No. P04849 (SEQ ID NO: 43):

SEQ ID NO: 43:
MGTIIQFLVVSCLLAGAGSLDPAALMQIGVIPTNVRQLMYYTEASSAFI
VVKLMPTIDSPISGCNITSISSYNATVTKLLQPIGENLETIRNQLIPTR
RRRRFAGVVIGLAALGVATAAQVTAAVALVKANENAAAILNLKNAIQKT
NAAVADVVQATQSLGTAVQAVQDHINSVVSPAITAANCKAQDAIIGSIL
NLYLTELTTIFHNQITNPALSPITIQALRILLGSTLPTVVEKSENTQIS
AAELLSSGLLTGQIVGLDLTYMQMVIKIELPTLTVQPATQIIDLATISA
FINNQEVMAQLPTRVMVTGSLIQAYPASQCTITPNTVYCRYNDAQVLSD
DTMACLQGNLTRCTFSPVVGSELTRFVLEDGIVYANCRSMLCKCMQPAA
VILQPSSSPVTVIDMYKCVSLQLDNLRFTITQLANVTYNSTI
KLESSQILSIDPLDISQNLAAVNKSLSDALQHLAQSDTYLSAITSATT
TSVLSIIAICLGSLGLILIILLSVVVWKLLTIVVANRNRMENFVYHK

SEQ ID NO: 44 is an example of an N-terminal fusion fragment and SEQ ID NO: 45 is an example of a C-terminal fusion fragment of this fusion protein:

SEQ ID NO: 44:
AAVALVKANENAAAILNLKNAIQKTNAAVADVVQATQSLGTAVQAVQDH
INSVVSPAITAAN

SEQ ID NO: 45:
KLESSQILSIDPLDISQNLAAVNKSLSDALQHLAQSDTYLSAI

In Vivo Expression Analysis of C46-CAR by BLT Mouse Model

The C46-CAR was tested in an in vivo humanized mouse model using previously described methods (Zhen, et al. J. Vis. Exp. (113), e54048, doi:10.3791/54048 (2016)). Briefly, NSG immunodeficient mice were transplanted with fetal human thymus and liver, and autologous human CD34+ cells that were transduced with a lentiviral vector expressing the C46-CAR and a cell surface HA reporter. Human T cell engraftment was assessed by flow cytometry for human CD45, CD3, CD4, and CD8 markers, and CAR-transduced cells were assessed by HA co-staining. FIG. 10 demonstrates baseline levels of 34% peripheral blood cells expressing C46-CAR, which were boosted transiently after HIV infection demonstrating responsiveness to HIV in vivo.

Anti-HIV Function of C46-CAR Transduced T Cells Developed in the BLT Mouse Model The mice described above were sacrificed and cells were harvested from spleen and bone marrow. These were tested in a standard Enzyme Linked Immune Spot (ELISpot) assay for interferon gamma production, as previously described (Ibarrondo, et al. (2005) J. Virology 79:4289-4297), with the modification that the cells were exposed to cells expressing cell surface HIV Env (Jurkat-HXBc2, NIH AIDS Reagent Repository) to assess responsiveness to Env. FIG. 11 shows that there was responsiveness to target cells expressing Env, thereby indicating that stem cells transduced with the C46-CAR construct differentiate in vivo into functional T cells that express C46-CARs.

REFERENCES

The following references are herein incorporated by reference in their entirety:

(1) Roberts M R et al. (1994) "Targeting of human immunodeficiency virus-infected cells by CD8+ T lymphocytes armed with universal T-cell receptors" *Blood* 84(9):2878-89.
(2) Yang O O et al. (1997) "Lysis of HIV-1-infected cells and inhibition of viral replication by universal receptor T cells" *Proc Natl Acad Sci USA* 94(21):11478-83.
(3) Ali A et al. (2016) "HIV-1-specific chimeric antigen receptors based on broadly neutralizing antibodies" *J Virol* 90(15):6999-7006, doi:10.1128/JVI.00805-16.
(4) White J M et al. (2008) "Structures and mechanisms of viral membrane fusion proteins: multiple variations on a common theme" *Crit Rev Biochem Mol Biol* 43(3):189-219, doi:10.1080/10409230802058320.
(5) Kielian M (2014) "Mechanisms of virus membrane fusion proteins" *Annu Rev Virol* 1(1):171-89, doi:10.1146/annurev-virology-031413-085521.
(6) Harrison S C (2015) "Viral membrane fusion" *Virology* 479-480:498-507, doi:10.1016/j.virol.2015.03.043.
(7) Watanabe S et al. (2000) "Functional importance of the coiled-coil of the ebola virus glycoprotein" *J Virol* 74(21):10194-201, doi:10.1128/JVI.74.21.10194-10201.2000.
(8) Bentz J (2000) "Membrane fusion mediated by coiled coils: a hypothesis" *Biophys J* 78(2):886-900, doi:10.1016/50006-3495(00)76646-X.
(9) Sanders R W (2002) "Mutational analyses and natural variability of the gp41 ectodomain" *WorldWideWebhivlanlgovcontentsequenceHIVREVIEWSSANDERS-Sanders*2002.*HyperText MarkupLanguage, wherein "HyperTextMarkupLanguage" is "html" and "WorldWideWeb" is "www".*
(10) Chan D C & Kim P S (1998) "HIV entry and its inhibition" *Cell* 93(5):681-4.
(11) Harrison S C (2008) "Viral membrane fusion" *Nat Struct Mol Biol* 15(7):690-8, doi:10.1038/nsmb.1456.
(12) Wang E et al. (2003) "Both heptad repeats of human respiratory syncytial virus fusion protein are potent inhibitors of viral fusion" *Biochem Biophys Res Commun* 302(3):469-75.
(13) Yang 00 et al. (1996) "Efficient lysis of human immunodeficiency virus type 1-infected cells by cytotoxic T lymphocytes" *J Virol* 70(9):5799-806.
(14) Adnan S et al. (2006) "Nef interference with HIV-1-specific CTL antiviral activity is epitope specific" *Blood* 108(10):3414-9, doi:10.1182/blood-2006-06-030668.

All scientific and technical terms used in this application have meanings commonly used in the art unless otherwise specified.

Except when specifically indicated, peptides are indicated with the N-terminus on the left and the sequences are written from the N-terminus to the C-terminus. Similarly, except when specifically indicated, nucleic acid sequences are indicated with the 5' end on the left and the sequences are written from 5' to 3'.

As used herein, a given percentage of "sequence identity" refers to the percentage of nucleotides or amino acid residues that are the same between sequences, when compared and optimally aligned for maximum correspondence over a given comparison window, as measured by visual inspection or by a sequence comparison algorithm in the art, such as the BLAST algorithm, which is described in Altschul et al., (1990) J Mol Biol 215:403-410. Software for performing BLAST (e.g., BLASTP and BLASTN) analyses is publicly available through the National Center for Biotechnology Information (ncbi.nlm.nih.gov). The comparison window can exist over a given portion, e.g., a functional domain, or an arbitrarily selection a given number of contiguous nucleotides or amino acid residues of one or both sequences. Alternatively, the comparison window can exist over the full length of the sequences being compared. For purposes herein, where a given comparison window (e.g., over 80% of the given sequence) is not provided, the recited sequence identity is over 100% of the given sequence. Additionally, for the percentages of sequence identity of the proteins provided herein, the percentages are determined using BLASTP 2.8.0+, scoring matrix BLOSUM62, and the default parameters available at blast.ncbi.nlm.nih.gov/Blast.cgi. See also Altschul, et al., (1997) Nucleic Acids Res 25:3389-3402; and Altschul, et al., (2005) FEBS J 272:5101-5109.

Optimal alignment of sequences for comparison can be conducted, e.g., by the local homology algorithm of Smith & Waterman, Adv Appl Math 2:482 (1981), by the homology alignment algorithm of Needleman & Wunsch, J Mol Biol 48:443 (1970), by the search for similarity method of Pearson & Lipman, PNAS USA 85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by visual inspection.

As used herein, the term "subject" includes humans and non-human subjects. The term "non-human subject" includes all vertebrates, e.g., mammals and non-mammals, such as non-human primates, horses, sheep, dogs, cows, pigs, chickens, and other veterinary subjects and test subjects.

The use of the singular can include the plural unless specifically stated otherwise. As used in the specification and the appended claims, the singular forms "a", "an", and "the" can include plural referents unless the context clearly dictates otherwise.

As used herein, "and/or" means "and" or "or". For example, "A and/or B" means "A, B, or both A and B" and "A, B, C, and/or D" means "A, B, C, D, or a combination thereof" and said "A, B, C, D, or a combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

As used herein, the phrase "one or more of", e.g., "one or more of A, B, and/or C" means "one or more of A", "one or more of B", "one or more of C", "one or more of A and one or more of B", "one or more of B and one or more of C", "one or more of A and one or more of C" and "one or more of A, one or more of B, and one or more of C".

The phrase "comprises or consists of A" is used as a tool to avoid excess page and translation fees and means that in some embodiments the given thing at issue: comprises A or consists of A. For example, the sentence "In some embodiments, the composition comprises or consists of A" is to be interpreted as if written as the following two separate sentences: "In some embodiments, the composition comprises A. In some embodiments, the composition consists of A."

Similarly, a sentence reciting a string of alternates is to be interpreted as if a string of sentences were provided such that each given alternate was provided in a sentence by itself. For example, the sentence "In some embodiments, the composition comprises A, B, or C" is to be interpreted as if written as the following three separate sentences: "In some embodiments, the composition comprises A. In some embodiments, the composition comprises B. In some embodiments, the composition comprises C." As another example, the sentence "In some embodiments, the composition comprises at least A, B, or C" is to be interpreted as if written as the following three separate sentences: "In some embodiments, the composition comprises at least A. In some embodiments, the composition comprises at least B. In some embodiments, the composition comprises at least C."

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An expression vector comprising a nucleic acid sequence that encodes a chimeric antigen receptor consisting of an amino acid sequence as set forth in SEQ ID NO: 18 or SEQ ID NO: 20.

2. An expression vector comprising a nucleic acid sequence that encodes a chimeric antigen receptor, wherein the nucleic acid sequence is SEQ ID NO: 17 or SEQ ID NO: 19.

3. A cell comprising an expression vector according to claim 1.

4. The cell according to claim 3, wherein the cell is a B cell, a T cell, a natural killer T cell, a hematopoietic stem cell, or a hematopoietic progenitor cell.

5. A cell that is the progeny of the cell of claim 3.

6. The cell according to claim 3, wherein the cell expresses the chimeric antigen receptor encoded by the expression vector.

7. A method of treating, reducing, or inhibiting HIV-1 in a subject, which comprises transplanting one or more cells according to claim 3, in the subject.

8. A method of killing an infected cell infected with HIV-1, which comprises contacting the infected cell with one or more cells according to claim 3.

9. The method according to claim 7, wherein the subject is human.

10. A cell comprising an expression vector according to claim 2.

11. The cell according to claim 10, wherein the cell is a B cell, a T cell, a natural killer T cell, a hematopoietic stem cell, or a hematopoietic progenitor cell.

12. A cell that is the progeny of the cell of claim 11.

13. The cell according to claim 12, wherein the cell expresses the chimeric antigen receptor encoded by the expression vector.

14. A chimeric antigen receptor encoded by the expression vector according to claim 1.

15. A chimeric antigen receptor encoded by the expression vector according to claim 2.

* * * * *

SEQUENCE LISTING

```
<160> NUMBER OF SEQ ID NOS: 45

<210> SEQ ID NO 1
<211> LENGTH: 138
<212> TYPE: DNA
<213> ORGANISM: Artificial Sequence
<220> FEATURE:
<223> OTHER INFORMATION: Sequence related to viral fusion protein

<400> SEQUENCE: 1

tggatggaat gggaccgcga gatcaacaac tacaccagcc tgatccacag cctgatcgag      60

gaaagccaga accagcagga aaagaacgag caggaactgc tggaactgga caagtgggcc     120

agcctgtgga actggttc                                                   138


<210> SEQ ID NO 2
<211> LENGTH: 46
<212> TYPE: PRT
<213> ORGANISM: Artificial Sequence
<220> FEATURE:
<223> OTHER INFORMATION: Sequence related to viral fusion protein

<400> SEQUENCE: 2

Trp Met Glu Trp Asp Arg Glu Ile Asn Asn Tyr Thr Ser Leu Ile His
1               5                   10                  15

Ser Leu Ile Glu Glu Ser Gln Asn Gln Gln Glu Lys Asn Glu Gln Glu
            20                  25                  30

Leu Leu Glu Leu Asp Lys Trp Ala Ser Leu Trp Asn Trp Phe
        35                  40                  45


<210> SEQ ID NO 3
<211> LENGTH: 33
<212> TYPE: DNA
<213> ORGANISM: Artificial Sequence
<220> FEATURE:
<223> OTHER INFORMATION: Sequence related to viral fusion protein

<400> SEQUENCE: 3

tctaagtacg gccctccctg ccccagctgc cct                                   33


<210> SEQ ID NO 4
<211> LENGTH: 11
<212> TYPE: PRT
<213> ORGANISM: Artificial Sequence
<220> FEATURE:
<223> OTHER INFORMATION: Sequence related to viral fusion protein

<400> SEQUENCE: 4

Ser Lys Tyr Gly Pro Pro Cys Pro Ser Cys Pro
1               5                   10
```

-continued

<210> SEQ ID NO 5
<211> LENGTH: 198
<212> TYPE: DNA
<213> ORGANISM: Artificial Sequence
<220> FEATURE:
<223> OTHER INFORMATION: Sequence related to viral fusion protein

<400> SEQUENCE: 5

```
gagctcaaga cccctctggg cgacacaacc cacacaagcc ctagaagccc tgagcctaag     60

agcagcgata cccctccacc ttctccaaga tctcccgagc ctaagtctag cgacacccca    120

cctccaagtc cacgcagccc agagccaaaa agctccgaca cacctcctcc atgtcctaga    180

tgtcctgctc ctgaactg                                                  198
```

<210> SEQ ID NO 6
<211> LENGTH: 66
<212> TYPE: PRT
<213> ORGANISM: Artificial Sequence
<220> FEATURE:
<223> OTHER INFORMATION: Sequence related to viral fusion protein

<400> SEQUENCE: 6

```
Glu Leu Lys Thr Pro Leu Gly Asp Thr Thr His Thr Ser Pro Arg Ser
1               5                   10                  15

Pro Glu Pro Lys Ser Ser Asp Thr Pro Pro Pro Ser Pro Arg Ser Pro
            20                  25                  30

Glu Pro Lys Ser Ser Asp Thr Pro Pro Pro Ser Pro Arg Ser Pro Glu
        35                  40                  45

Pro Lys Ser Ser Asp Thr Pro Pro Pro Cys Pro Arg Cys Pro Ala Pro
    50                  55                  60

Glu Leu
65
```

<210> SEQ ID NO 7
<211> LENGTH: 66
<212> TYPE: PRT
<213> ORGANISM: Artificial Sequence
<220> FEATURE:
<223> OTHER INFORMATION: Sequence related to viral fusion protein

<400> SEQUENCE: 7

```
Glu Leu Lys Thr Pro Leu Gly Asp Thr Thr His Thr Cys Pro Arg Cys
1               5                   10                  15

Pro Glu Pro Lys Ser Cys Asp Thr Pro Pro Pro Cys Pro Arg Cys Pro
            20                  25                  30

Glu Pro Lys Ser Cys Asp Thr Pro Pro Pro Cys Pro Arg Cys Pro Glu
        35                  40                  45

Pro Lys Ser Cys Asp Thr Pro Pro Pro Cys Pro Arg Cys Pro Ala Pro
    50                  55                  60

Glu Leu
65
```

<210> SEQ ID NO 8
<211> LENGTH: 19
<212> TYPE: PRT
<213> ORGANISM: Artificial Sequence
<220> FEATURE:
<223> OTHER INFORMATION: Sequence related to viral fusion protein -continued

<400> SEQUENCE: 8

```
Glu Pro Lys Ser Cys Asp Lys Thr His Thr Cys Pro Pro Cys Pro Ala
1               5                   10                  15

Pro Glu Leu
```

```
<210> SEQ ID NO 9
<211> LENGTH: 75
<212> TYPE: DNA
<213> ORGANISM: Artificial Sequence
<220> FEATURE:
<223> OTHER INFORMATION: Sequence related to viral fusion protein

<400> SEQUENCE: 9

gatatctaca tctgggcgcc cttggccggg acttgtgggg tccttctcct gtcactggtt      60

atcacccttt actgc                                                       75


<210> SEQ ID NO 10
<211> LENGTH: 25
<212> TYPE: PRT
<213> ORGANISM: Artificial Sequence
<220> FEATURE:
<223> OTHER INFORMATION: Sequence related to viral fusion protein

<400> SEQUENCE: 10

Asp Ile Tyr Ile Trp Ala Pro Leu Ala Gly Thr Cys Gly Val Leu Leu
1               5                   10                  15

Leu Ser Leu Val Ile Thr Leu Tyr Cys
            20                  25


<210> SEQ ID NO 11
<211> LENGTH: 126
<212> TYPE: DNA
<213> ORGANISM: Artificial Sequence
<220> FEATURE:
<223> OTHER INFORMATION: Sequence related to viral fusion protein

<400> SEQUENCE: 11

aaacggggca gaaagaaact cctgtatata ttcaaacaac catttatgag accagtacaa      60

actactcaag aggaagatgg ctgtagctgc cgatttccag aagaagaaga aggaggatgt     120

gaactg                                                                126


<210> SEQ ID NO 12
<211> LENGTH: 42
<212> TYPE: PRT
<213> ORGANISM: Artificial Sequence
<220> FEATURE:
<223> OTHER INFORMATION: Sequence related to viral fusion protein

<400> SEQUENCE: 12

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40


<210> SEQ ID NO 13
<211> LENGTH: 339
<212> TYPE: DNA
<213> ORGANISM: Artificial Sequence
<220> FEATURE:
```

-continued

<223> OTHER INFORMATION: Sequence related to viral fusion protein

<400> SEQUENCE: 13
agagtgaagt tcagcaggag cgcagacgcc cccgcgtaca agcagggcca gaaccagctc 60
tataacgagc tcaatctagg acgaagagag gagtacgatg ttttggacaa gagacgtggc 120
cgggaccctg agatgggggg aaagccgaga aggaagaacc ctcaggaagg cctgtacaat 180
gaactgcaga aagataagat ggcggaggcc tacagtgaga ttgggatgaa aggcgagcgc 240
cggaggggca aggggcacga tggcctttac cagggtctca gtacagccac caaggacacc 300
tacgacgccc ttcacatgca ggccctgccc cctcgctaa 339

<210> SEQ ID NO 14
<211> LENGTH: 112
<212> TYPE: PRT
<213> ORGANISM: Artificial Sequence
<220> FEATURE:
<223> OTHER INFORMATION: Sequence related to viral fusion protein

<400> SEQUENCE: 14

```
Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 15
<211> LENGTH: 66
<212> TYPE: DNA
<213> ORGANISM: Artificial Sequence
<220> FEATURE:
<223> OTHER INFORMATION: Sequence related to viral fusion protein

<400> SEQUENCE: 15
atgctgctgc tggtgacaag cctgctgctg tgcgagctgc cccaccccgc ctttctgctg 60
atcccc 66

<210> SEQ ID NO 16
<211> LENGTH: 22
<212> TYPE: PRT
<213> ORGANISM: Artificial Sequence
<220> FEATURE:
<223> OTHER INFORMATION: Sequence related to viral fusion protein

<400> SEQUENCE: 16

```
Met Leu Leu Leu Val Thr Ser Leu Leu Leu Cys Glu Leu Pro His Pro
1               5                   10                  15

Ala Phe Leu Leu Ile Pro
            20
```

<210> SEQ ID NO 17

<211> LENGTH: 786
<212> TYPE: DNA
<213> ORGANISM: Artificial Sequence
<220> FEATURE:
<223> OTHER INFORMATION: Sequence related to viral fusion protein

<400> SEQUENCE: 17

```
atgctgctgc tggtgacaag cctgctgctg tgcgagctgc cccaccccgc ctttctgctg     60

atcccctgga tggaatggga ccgcgagatc aacaactaca ccagcctgat ccacagcctg    120

atcgaggaaa gccagaacca gcaggaaaag aacgagcagg aactgctgga actggacaag    180

tgggccagcc tgtggaactg gttcagaagc tctaagtacg gccctccctg ccccagctgc    240

cctggcgata tctacatctg ggcgcccttg gccgggactt gtggggtcct tctcctgtca    300

ctggttatca ccctttactg caaacggggc agaaagaaac tcctgtatat attcaaacaa    360

ccatttatga gaccagtaca aactactcaa gaggaagatg gctgtagctg ccgatttcca    420

gaagaagaag aaggaggatg tgaactgaga gtgaagttca gcaggagcgc agacgccccc    480

gcgtacaagc agggccagaa ccagctctat aacgagctca atctaggacg aagagaggag    540

tacgatgttt tggacaagag acgtggccgg gaccctgaga tgggggggaaa gccgagaagg    600

aagaaccctc aggaaggcct gtacaatgaa ctgcagaaag ataagatggc ggaggcctac    660

agtgagattg ggatgaaagg cgagcgccgg aggggcaagg ggcacgatgg cctttaccag    720

ggtctcagta cagccaccaa ggacacctac gacgcccttc acatgcaggc cctgcccccct    780

cgctaa                                                               786
```

<210> SEQ ID NO 18
<211> LENGTH: 261
<212> TYPE: PRT
<213> ORGANISM: Artificial Sequence
<220> FEATURE:
<223> OTHER INFORMATION: Sequence related to viral fusion protein

<400> SEQUENCE: 18

```
Met Leu Leu Leu Val Thr Ser Leu Leu Leu Cys Glu Leu Pro His Pro
1               5                   10                  15

Ala Phe Leu Leu Ile Pro Trp Met Glu Trp Asp Arg Glu Ile Asn Asn
            20                  25                  30

Tyr Thr Ser Leu Ile His Ser Leu Ile Glu Glu Ser Gln Asn Gln Gln
        35                  40                  45

Glu Lys Asn Glu Gln Glu Leu Leu Glu Leu Asp Lys Trp Ala Ser Leu
    50                  55                  60

Trp Asn Trp Phe Arg Ser Ser Lys Tyr Gly Pro Pro Cys Pro Ser Cys
65                  70                  75                  80

Pro Gly Asp Ile Tyr Ile Trp Ala Pro Leu Ala Gly Thr Cys Gly Val
                85                  90                  95

Leu Leu Leu Ser Leu Val Ile Thr Leu Tyr Cys Lys Arg Gly Arg Lys
            100                 105                 110

Lys Leu Leu Tyr Ile Phe Lys Gln Pro Phe Met Arg Pro Val Gln Thr
        115                 120                 125

Thr Gln Glu Glu Asp Gly Cys Ser Cys Arg Phe Pro Glu Glu Glu Glu
    130                 135                 140

Gly Gly Cys Glu Leu Arg Val Lys Phe Ser Arg Ser Ala Asp Ala Pro
145                 150                 155                 160

Ala Tyr Lys Gln Gly Gln Asn Gln Leu Tyr Asn Glu Leu Asn Leu Gly
                165                 170                 175
```

-continued

```
Arg Arg Glu Glu Tyr Asp Val Leu Asp Lys Arg Arg Gly Arg Asp Pro
            180                 185                 190

Glu Met Gly Gly Lys Pro Arg Arg Lys Asn Pro Gln Glu Gly Leu Tyr
        195                 200                 205

Asn Glu Leu Gln Lys Asp Lys Met Ala Glu Ala Tyr Ser Glu Ile Gly
    210                 215                 220

Met Lys Gly Glu Arg Arg Arg Gly Lys Gly His Asp Gly Leu Tyr Gln
225                 230                 235                 240

Gly Leu Ser Thr Ala Thr Lys Asp Thr Tyr Asp Ala Leu His Met Gln
                245                 250                 255

Ala Leu Pro Pro Arg
            260


<210> SEQ ID NO 19
<211> LENGTH: 951
<212> TYPE: DNA
<213> ORGANISM: Artificial Sequence
<220> FEATURE:
<223> OTHER INFORMATION: Sequence related to viral fusion protein

<400> SEQUENCE: 19

atgctgctgc tggtgacaag cctgctgctg tgcgagctgc cccaccccgc ctttctgctg      60

atcccctgga tggaatggga ccgcgagatc aacaactaca ccagcctgat ccacagcctg     120

atcgaggaaa gccagaacca gcaggaaaag aacgagcagg aactgctgga actggacaag     180

tgggccagcc tgtggaactg gttcagaagc gagctcaaga cccctctggg cgacacaacc     240

cacacaagcc ctagaagccc tgagcctaag agcagcgata cccctccacc ttctccaaga     300

tctcccgagc ctaagtctag cgacacccca cctccaagtc cacgcagccc agagccaaaa     360

agctccgaca cacctcctcc atgtcctaga tgtcctgctc ctgaactggg cgatatctac     420

atctgggcgc ccttggccgg gacttgtggg gtccttctcc tgtcactggt tatcaccctt     480

tactgcaaac ggggcagaaa gaaactcctg tatatattca aacaaccatt tatgagacca     540

gtacaaacta ctcaagagga agatggctgt agctgccgat ttccagaaga agaagaagga     600

ggatgtgaac tgagagtgaa gttcagcagg agcgcagacg cccccgcgta caagcagggc     660

cagaaccagc tctataacga gctcaatcta ggacgaagag aggagtacga tgttttggac     720

aagagacgtg gccgggaccc tgagatgggg ggaaagccga gaaggaagaa ccctcaggaa     780

ggcctgtaca atgaactgca gaaagataag atggcggagg cctacagtga gattgggatg     840

aaaggcgagc gccggagggg caaggggcac gatggccttt accagggtct cagtacagcc     900

accaaggaca cctacgacgc ccttcacatg caggccctgc cccctcgcta a              951


<210> SEQ ID NO 20
<211> LENGTH: 316
<212> TYPE: PRT
<213> ORGANISM: Artificial Sequence
<220> FEATURE:
<223> OTHER INFORMATION: Sequence related to viral fusion protein

<400> SEQUENCE: 20

Met Leu Leu Leu Val Thr Ser Leu Leu Leu Cys Glu Leu Pro His Pro
1               5                   10                  15

Ala Phe Leu Leu Ile Pro Trp Met Glu Trp Asp Arg Glu Ile Asn Asn
            20                  25                  30

Tyr Thr Ser Leu Ile His Ser Leu Ile Glu Glu Ser Gln Asn Gln Gln
        35                  40                  45
```

-continued

```
Glu Lys Asn Glu Gln Glu Leu Leu Glu Leu Asp Lys Trp Ala Ser Leu
    50                  55                  60

Trp Asn Trp Phe Arg Ser Glu Leu Lys Thr Pro Leu Gly Asp Thr Thr
65                  70                  75                  80

His Thr Ser Pro Arg Ser Pro Glu Pro Lys Ser Ser Asp Thr Pro Pro
                85                  90                  95

Pro Ser Pro Arg Ser Pro Glu Pro Lys Ser Ser Asp Thr Pro Pro Pro
            100                 105                 110

Ser Pro Arg Ser Pro Glu Pro Lys Ser Ser Asp Thr Pro Pro Pro Cys
        115                 120                 125

Pro Arg Cys Pro Ala Pro Glu Leu Gly Asp Ile Tyr Ile Trp Ala Pro
    130                 135                 140

Leu Ala Gly Thr Cys Gly Val Leu Leu Leu Ser Leu Val Ile Thr Leu
145                 150                 155                 160

Tyr Cys Lys Arg Gly Arg Lys Lys Leu Leu Tyr Ile Phe Lys Gln Pro
                165                 170                 175

Phe Met Arg Pro Val Gln Thr Thr Gln Glu Glu Asp Gly Cys Ser Cys
            180                 185                 190

Arg Phe Pro Glu Glu Glu Glu Gly Gly Cys Glu Leu Arg Val Lys Phe
        195                 200                 205

Ser Arg Ser Ala Asp Ala Pro Ala Tyr Lys Gln Gly Gln Asn Gln Leu
    210                 215                 220

Tyr Asn Glu Leu Asn Leu Gly Arg Arg Glu Glu Tyr Asp Val Leu Asp
225                 230                 235                 240

Lys Arg Arg Gly Arg Asp Pro Glu Met Gly Gly Lys Pro Arg Arg Lys
                245                 250                 255

Asn Pro Gln Glu Gly Leu Tyr Asn Glu Leu Gln Lys Asp Lys Met Ala
            260                 265                 270

Glu Ala Tyr Ser Glu Ile Gly Met Lys Gly Glu Arg Arg Arg Gly Lys
        275                 280                 285

Gly His Asp Gly Leu Tyr Gln Gly Leu Ser Thr Ala Thr Lys Asp Thr
    290                 295                 300

Tyr Asp Ala Leu His Met Gln Ala Leu Pro Pro Arg
305                 310                 315
```

<210> SEQ ID NO 21
<211> LENGTH: 345
<212> TYPE: PRT
<213> ORGANISM: Artificial Sequence
<220> FEATURE:
<223> OTHER INFORMATION: Sequence related to viral fusion protein

<400> SEQUENCE: 21

```
Ala Val Gly Ile Gly Ala Leu Phe Leu Gly Phe Leu Gly Ala Ala Gly
1               5                   10                  15

Ser Thr Met Gly Ala Ala Ser Met Thr Leu Thr Val Gln Ala Arg Gln
            20                  25                  30

Leu Leu Ser Gly Ile Val Gln Gln Gln Asn Asn Leu Leu Arg Ala Ile
        35                  40                  45

Glu Ala Gln Gln His Leu Leu Gln Leu Thr Val Trp Gly Ile Lys Gln
    50                  55                  60

Leu Gln Ala Arg Ile Leu Ala Val Glu Arg Tyr Leu Lys Asp Gln Gln
65                  70                  75                  80

Leu Leu Gly Ile Trp Gly Cys Ser Gly Lys Leu Ile Cys Thr Thr Ala
                85                  90                  95
```

-continued

```
Val Pro Trp Asn Ala Ser Trp Ser Asn Lys Ser Leu Glu Gln Ile Trp
            100                 105                 110

Asn His Thr Thr Trp Met Glu Trp Asp Arg Glu Ile Asn Asn Tyr Thr
        115                 120                 125

Ser Leu Ile His Ser Leu Ile Glu Glu Ser Gln Asn Gln Gln Glu Lys
    130                 135                 140

Asn Glu Gln Glu Leu Leu Glu Leu Asp Lys Trp Ala Ser Leu Trp Asn
145                 150                 155                 160

Trp Phe Asn Ile Thr Asn Trp Leu Trp Tyr Ile Lys Leu Phe Ile Met
                165                 170                 175

Ile Val Gly Gly Leu Val Gly Leu Arg Ile Val Phe Ala Val Leu Ser
            180                 185                 190

Ile Val Asn Arg Val Arg Gln Gly Tyr Ser Pro Leu Ser Phe Gln Thr
        195                 200                 205

His Leu Pro Thr Pro Arg Gly Pro Asp Arg Pro Glu Gly Ile Glu Glu
    210                 215                 220

Glu Gly Gly Glu Arg Asp Arg Asp Arg Ser Ile Arg Leu Val Asn Gly
225                 230                 235                 240

Ser Leu Ala Leu Ile Trp Asp Asp Leu Arg Ser Leu Cys Leu Phe Ser
                245                 250                 255

Tyr His Arg Leu Arg Asp Leu Leu Leu Ile Val Thr Arg Ile Val Glu
            260                 265                 270

Leu Leu Gly Arg Arg Gly Trp Glu Ala Leu Lys Tyr Trp Trp Asn Leu
        275                 280                 285

Leu Gln Tyr Trp Ser Gln Glu Leu Lys Asn Ser Ala Val Ser Leu Leu
    290                 295                 300

Asn Ala Thr Ala Ile Ala Val Ala Glu Gly Thr Asp Arg Val Ile Glu
305                 310                 315                 320

Val Val Gln Gly Ala Cys Arg Ala Ile Arg His Ile Pro Arg Arg Ile
                325                 330                 335

Arg Gln Gly Leu Glu Arg Ile Leu Leu
            340                 345
```

<210> SEQ ID NO 22
<211> LENGTH: 166
<212> TYPE: PRT
<213> ORGANISM: Artificial Sequence
<220> FEATURE:
<223> OTHER INFORMATION: Sequence related to viral fusion protein

<400> SEQUENCE: 22

```
Gly Ala Leu Phe Leu Gly Phe Leu Gly Ala Ala Gly Ser Thr Met Gly
1               5                   10                  15

Ala Ala Ser Met Thr Leu Thr Val Gln Ala Arg Gln Leu Leu Ser Gly
            20                  25                  30

Ile Val Gln Gln Gln Asn Asn Leu Leu Arg Ala Ile Glu Ala Gln Gln
        35                  40                  45

His Leu Leu Gln Leu Thr Val Trp Gly Ile Lys Gln Leu Gln Ala Arg
    50                  55                  60

Ile Leu Ala Val Glu Arg Tyr Leu Lys Asp Gln Gln Leu Leu Gly Ile
65                  70                  75                  80

Trp Gly Cys Ser Gly Lys Leu Ile Cys Thr Thr Ala Val Pro Trp Asn
                85                  90                  95

Ala Ser Trp Ser Asn Lys Ser Leu Glu Gln Ile Trp Asn His Thr Thr
            100                 105                 110
```

-continued

```
Trp Met Glu Trp Asp Arg Glu Ile Asn Asn Tyr Thr Ser Leu Ile His
        115                 120                 125

Ser Leu Ile Glu Glu Ser Gln Asn Gln Gln Glu Lys Asn Glu Gln Glu
    130                 135                 140

Leu Leu Glu Leu Asp Lys Trp Ala Ser Leu Trp Asn Trp Phe Asn Ile
145                 150                 155                 160

Thr Asn Trp Leu Trp Tyr
                165


<210> SEQ ID NO 23
<211> LENGTH: 41
<212> TYPE: PRT
<213> ORGANISM: Artificial Sequence
<220> FEATURE:
<223> OTHER INFORMATION: Sequence related to viral fusion protein

<400> SEQUENCE: 23

Ala Arg Gln Leu Leu Ser Gly Ile Val Gln Gln Gln Asn Asn Leu Leu
1               5                   10                  15

Arg Ala Ile Glu Ala Gln Gln His Leu Leu Gln Leu Thr Val Trp Gly
            20                  25                  30

Ile Lys Gln Leu Gln Ala Arg Ile Leu
        35                  40


<210> SEQ ID NO 24
<211> LENGTH: 38
<212> TYPE: PRT
<213> ORGANISM: Artificial Sequence
<220> FEATURE:
<223> OTHER INFORMATION: Sequence related to viral fusion protein

<400> SEQUENCE: 24

Trp Met Glu Trp Asp Arg Glu Ile Asn Asn Tyr Thr Ser Leu Ile His
1               5                   10                  15

Ser Leu Ile Glu Glu Ser Gln Asn Gln Gln Glu Lys Asn Glu Gln Glu
            20                  25                  30

Leu Leu Glu Leu Asp Lys
        35


<210> SEQ ID NO 25
<211> LENGTH: 366
<212> TYPE: PRT
<213> ORGANISM: Artificial Sequence
<220> FEATURE:
<223> OTHER INFORMATION: Sequence related to viral fusion protein

<400> SEQUENCE: 25

Met Tyr Thr Thr Gly Gly Thr Ser Arg Asn Lys Arg Gly Val Phe Val
1               5                   10                  15

Leu Gly Phe Leu Gly Phe Leu Ala Thr Ala Gly Ser Ala Met Gly Ala
            20                  25                  30

Ala Ser Leu Thr Leu Thr Ala Gln Ser Arg Thr Leu Leu Ala Gly Ile
        35                  40                  45

Val Gln Gln Gln Gln Gln Leu Leu Asp Val Val Lys Arg Gln Gln Glu
    50                  55                  60

Leu Leu Arg Leu Thr Val Trp Gly Thr Lys Asn Leu Gln Thr Arg Val
65                  70                  75                  80

Thr Ala Ile Glu Lys Tyr Leu Lys Asp Gln Ala Gln Leu Asn Ala Trp
                85                  90                  95
```

```
Gly Cys Ala Phe Arg Gln Val Cys His Thr Thr Val Pro Trp Pro Asn
            100                 105                 110

Ala Ser Leu Thr Pro Asn Trp Asn Asn Asp Thr Trp Gln Glu Trp Glu
        115                 120                 125

Arg Lys Val Asp Phe Leu Glu Glu Asn Ile Thr Ala Leu Leu Glu Glu
    130                 135                 140

Ala Gln Ile Gln Gln Glu Lys Asn Met Tyr Glu Leu Gln Lys Leu Asn
145                 150                 155                 160

Ser Trp Asp Val Phe Gly Asn Trp Phe Asp Leu Ala Ser Trp Ile Lys
                165                 170                 175

Tyr Ile Gln Tyr Gly Ile Tyr Ile Val Val Gly Val Ile Leu Leu Arg
            180                 185                 190

Ile Val Ile Tyr Ile Val Gln Met Leu Ala Lys Leu Arg Gln Gly Tyr
        195                 200                 205

Arg Pro Val Phe Ser Ser Pro Pro Ser Tyr Phe Gln Gln Thr His Ile
    210                 215                 220

Gln Gln Asp Pro Ala Leu Pro Thr Arg Glu Gly Lys Glu Gly Asp Gly
225                 230                 235                 240

Gly Glu Ser Gly Gly Asn Ser Ser Trp Pro Trp Gln Ile Glu Tyr Ile
                245                 250                 255

His Phe Leu Ile Arg Gln Leu Ile Arg Leu Leu Thr Trp Leu Phe Ser
            260                 265                 270

Asn Cys Arg Thr Leu Leu Ser Arg Ala Tyr Gln Ile Leu Gln Pro Ile
        275                 280                 285

Leu Gln Arg Leu Ser Ala Ala Leu Gln Arg Ile Arg Glu Val Leu Arg
    290                 295                 300

Thr Glu Leu Thr Tyr Leu Gln Tyr Gly Trp Ser Tyr Phe Gln Glu Ala
305                 310                 315                 320

Val Gln Val Gly Trp Arg Ser Ala Thr Glu Thr Leu Ala Gly Ala Trp
                325                 330                 335

Gly Asp Leu Trp Glu Thr Leu Arg Arg Gly Gly Arg Trp Ile Leu Ala
            340                 345                 350

Ile Pro Arg Arg Ile Arg Gln Gly Leu Glu Leu Thr Leu Leu
        355                 360                 365


<210> SEQ ID NO 26
<211> LENGTH: 51
<212> TYPE: PRT
<213> ORGANISM: Artificial Sequence
<220> FEATURE:
<223> OTHER INFORMATION: Sequence related to viral fusion protein

<400> SEQUENCE: 26

Arg Thr Leu Leu Ala Gly Ile Val Gln Gln Gln Gln Gln Leu Leu Asp
1               5                   10                  15

Val Val Lys Arg Gln Gln Glu Leu Leu Arg Leu Thr Val Trp Gly Thr
            20                  25                  30

Lys Asn Leu Gln Thr Arg Val Thr Ala Ile Glu Lys Tyr Leu Lys Asp
        35                  40                  45

Gln Ala Gln
    50


<210> SEQ ID NO 27
<211> LENGTH: 41
<212> TYPE: PRT
<213> ORGANISM: Artificial Sequence
```

<220> FEATURE:
<223> OTHER INFORMATION: Sequence related to viral fusion protein

<400> SEQUENCE: 27

```
Trp Asn Asn Asp Thr Trp Gln Glu Trp Glu Arg Lys Val Asp Phe Leu
1               5                   10                  15

Glu Glu Asn Ile Thr Ala Leu Leu Glu Glu Ala Gln Ile Gln Gln Glu
            20                  25                  30

Lys Asn Met Tyr Glu Leu Gln Lys Leu
        35                  40
```

<210> SEQ ID NO 28
<211> LENGTH: 169
<212> TYPE: PRT
<213> ORGANISM: Artificial Sequence
<220> FEATURE:
<223> OTHER INFORMATION: Sequence related to viral fusion protein

<400> SEQUENCE: 28

```
Gly Leu Phe Gly Ala Ile Ala Gly Phe Ile Glu Asn Gly Trp Glu Gly
1               5                   10                  15

Leu Ile Asp Gly Trp Tyr Gly Phe Arg His Gln Asn Ala Gln Gly Glu
            20                  25                  30

Gly Thr Ala Ala Asp Tyr Lys Ser Thr Gln Ser Ala Ile Asp Gln Ile
        35                  40                  45

Thr Gly Lys Leu Asn Arg Leu Ile Glu Lys Thr Asn Gln Gln Phe Glu
    50                  55                  60

Leu Ile Asp Asn Glu Phe Asn Glu Val Glu Lys Gln Ile Gly Asn Val
65                  70                  75                  80

Ile Asn Trp Thr Arg Asp Ser Ile Thr Glu Val Trp Ser Tyr Asn Ala
                85                  90                  95

Glu Leu Leu Val Ala Met Glu Asn Gln His Thr Ile Asp Leu Ala Asp
            100                 105                 110

Ser Glu Met Asp Lys Leu Tyr Glu Arg Val Lys Arg Gln Leu Arg Glu
        115                 120                 125

Asn Ala Glu Glu Asp Gly Thr Gly Cys Phe Glu Ile Phe His Lys Cys
    130                 135                 140

Asp Asp Asp Cys Met Ala Ser Ile Arg Asn Asn Thr Tyr Asp His Ser
145                 150                 155                 160

Lys Tyr Arg Glu Glu Ala Met Gln Asn
                165
```

<210> SEQ ID NO 29
<211> LENGTH: 67
<212> TYPE: PRT
<213> ORGANISM: Artificial Sequence
<220> FEATURE:
<223> OTHER INFORMATION: Sequence related to viral fusion protein

<400> SEQUENCE: 29

```
Tyr Lys Ser Thr Gln Ser Ala Ile Asp Gln Ile Thr Gly Lys Leu Asn
1               5                   10                  15

Arg Leu Ile Glu Lys Thr Asn Gln Gln Phe Glu Leu Ile Asp Asn Glu
            20                  25                  30

Phe Asn Glu Val Glu Lys Gln Ile Gly Asn Val Ile Asn Trp Thr Arg
        35                  40                  45

Asp Ser Ile Thr Glu Val Trp Ser Tyr Asn Ala Glu Leu Leu Val Ala
    50                  55                  60
```

-continued

```
Met Glu Asn
65


<210> SEQ ID NO 30
<211> LENGTH: 19
<212> TYPE: PRT
<213> ORGANISM: Artificial Sequence
<220> FEATURE:
<223> OTHER INFORMATION: Sequence related to viral fusion protein

<400> SEQUENCE: 30

Leu Ala Asp Ser Glu Met Asp Lys Leu Tyr Glu Arg Val Lys Arg Gln
1               5                   10                  15

Leu Arg Glu


<210> SEQ ID NO 31
<211> LENGTH: 175
<212> TYPE: PRT
<213> ORGANISM: Artificial Sequence
<220> FEATURE:
<223> OTHER INFORMATION: Sequence related to viral fusion protein

<400> SEQUENCE: 31

Glu Ala Ile Val Asn Ala Gln Pro Lys Cys Asn Pro Asn Leu His Tyr
1               5                   10                  15

Trp Thr Thr Gln Asp Glu Gly Ala Ala Ile Gly Leu Ala Trp Ile Pro
            20                  25                  30

Tyr Phe Gly Pro Ala Ala Glu Gly Ile Tyr Ile Glu Gly Leu Met His
        35                  40                  45

Asn Gln Asp Gly Leu Ile Cys Gly Leu Arg Gln Leu Ala Asn Glu Thr
    50                  55                  60

Thr Gln Ala Leu Gln Leu Phe Leu Arg Ala Thr Thr Glu Leu Arg Thr
65                  70                  75                  80

Phe Ser Ile Leu Asn Arg Lys Ala Ile Asp Phe Leu Leu Gln Arg Trp
                85                  90                  95

Gly Gly Thr Cys His Ile Leu Gly Pro Asp Cys Cys Ile Glu Pro His
            100                 105                 110

Asp Trp Thr Lys Asn Ile Thr Asp Lys Ile Asp Gln Ile Ile His Asp
        115                 120                 125

Phe Val Asp Lys Thr Leu Pro Asp Gln Gly Asp Asn Asp Asn Trp Trp
    130                 135                 140

Thr Gly Trp Arg Gln Trp Ile Pro Ala Gly Ile Gly Val Thr Gly Val
145                 150                 155                 160

Ile Ile Ala Val Ile Ala Leu Phe Cys Ile Cys Lys Phe Val Phe
                165                 170                 175


<210> SEQ ID NO 32
<211> LENGTH: 42
<212> TYPE: PRT
<213> ORGANISM: Artificial Sequence
<220> FEATURE:
<223> OTHER INFORMATION: Sequence related to viral fusion protein

<400> SEQUENCE: 32

Asp Gly Leu Ile Cys Gly Leu Arg Gln Leu Ala Asn Glu Thr Thr Gln
1               5                   10                  15

Ala Leu Gln Leu Phe Leu Arg Ala Thr Thr Glu Leu Arg Thr Phe Ser
            20                  25                  30

Ile Leu Asn Arg Lys Ala Ile Asp Phe Leu
        35                  40
```

<210> SEQ ID NO 33
<211> LENGTH: 25
<212> TYPE: PRT
<213> ORGANISM: Artificial Sequence
<220> FEATURE:
<223> OTHER INFORMATION: Sequence related to viral fusion protein

<400> SEQUENCE: 33

His Asp Trp Thr Lys Asn Ile Thr Asp Lys Ile Asp Gln Ile Ile His
1               5                   10                  15

Asp Phe Val Asp Lys Thr Leu Pro Asp
            20                  25

<210> SEQ ID NO 34
<211> LENGTH: 180
<212> TYPE: PRT
<213> ORGANISM: Artificial Sequence
<220> FEATURE:
<223> OTHER INFORMATION: Sequence related to viral fusion protein

<400> SEQUENCE: 34

Glu Pro Val Ser Leu Thr Leu Ala Leu Leu Leu Gly Gly Leu Thr Met
1               5                   10                  15

Gly Gly Ile Ala Ala Gly Ile Gly Thr Gly Thr Thr Ala Leu Met Ala
            20                  25                  30

Thr Gln Gln Phe Gln Gln Leu Gln Ala Ala Val Gln Asp Asp Leu Arg
        35                  40                  45

Glu Val Glu Lys Ser Ile Ser Asn Leu Glu Lys Ser Leu Thr Ser Leu
    50                  55                  60

Ser Glu Val Val Leu Gln Asn Arg Arg Gly Leu Asp Leu Leu Phe Leu
65                  70                  75                  80

Lys Glu Gly Gly Leu Cys Ala Ala Leu Lys Glu Glu Cys Cys Phe Tyr
                85                  90                  95

Ala Asp His Thr Gly Leu Val Arg Asp Ser Met Ala Lys Leu Arg Glu
            100                 105                 110

Arg Leu Asn Gln Arg Gln Lys Leu Phe Glu Ser Thr Gln Gly Trp Phe
        115                 120                 125

Glu Gly Leu Phe Asn Arg Ser Pro Trp Phe Thr Thr Leu Ile Ser Thr
    130                 135                 140

Ile Met Gly Pro Leu Ile Val Leu Leu Met Ile Leu Leu Phe Gly Pro
145                 150                 155                 160

Cys Ile Leu Asn Arg Leu Val Gln Phe Val Lys Asp Arg Ile Ser Val
                165                 170                 175

Val Gln Ala Leu
            180

<210> SEQ ID NO 35
<211> LENGTH: 33
<212> TYPE: PRT
<213> ORGANISM: Artificial Sequence
<220> FEATURE:
<223> OTHER INFORMATION: Sequence related to viral fusion protein

<400> SEQUENCE: 35

Asp Leu Arg Glu Val Glu Lys Ser Ile Ser Asn Leu Glu Lys Ser Leu
1               5                   10                  15

Thr Ser Leu Ser Glu Val Val Leu Gln Asn Arg Arg Gly Leu Asp Leu
20 25 30

Leu

<210> SEQ ID NO 36
<211> LENGTH: 6
<212> TYPE: PRT
<213> ORGANISM: Artificial Sequence
<220> FEATURE:
<223> OTHER INFORMATION: Sequence related to viral fusion protein

<400> SEQUENCE: 36

Leu Cys Ala Ala Leu Lys
1 5

<210> SEQ ID NO 37
<211> LENGTH: 176
<212> TYPE: PRT
<213> ORGANISM: Artificial Sequence
<220> FEATURE:
<223> OTHER INFORMATION: Sequence related to viral fusion protein

<400> SEQUENCE: 37

Ala Val Pro Val Ala Val Trp Leu Val Ser Ala Leu Ala Met Gly Ala
1 5 10 15

Gly Val Ala Gly Gly Ile Thr Gly Ser Met Ser Leu Ala Ser Gly Lys
20 25 30

Ser Leu Leu His Glu Val Asp Lys Asp Ile Ser Gln Leu Thr Gln Ala
35 40 45

Ile Val Lys Asn His Lys Asn Leu Leu Lys Ile Ala Gln Tyr Ala Ala
50 55 60

Gln Asn Arg Arg Gly Leu Asp Leu Leu Phe Trp Glu Gln Gly Gly Leu
65 70 75 80

Cys Lys Ala Leu Gln Glu Gln Cys Arg Phe Pro Asn Ile Thr Asn Ser
85 90 95

His Val Pro Ile Leu Gln Glu Arg Pro Pro Leu Glu Asn Arg Val Leu
100 105 110

Thr Gly Trp Gly Leu Asn Trp Asp Leu Gly Leu Ser Gln Trp Ala Arg
115 120 125

Glu Ala Leu Gln Thr Gly Ile Thr Leu Val Ala Leu Leu Leu Leu Val
130 135 140

Ile Leu Ala Gly Pro Cys Ile Leu Arg Gln Leu Arg His Leu Pro Ser
145 150 155 160

Arg Val Arg Tyr Pro His Tyr Ser Leu Ile Lys Pro Glu Ser Ser Leu
165 170 175

<210> SEQ ID NO 38
<211> LENGTH: 47
<212> TYPE: PRT
<213> ORGANISM: Artificial Sequence
<220> FEATURE:
<223> OTHER INFORMATION: Sequence related to viral fusion protein

<400> SEQUENCE: 38

Ser Leu Ala Ser Gly Lys Ser Leu Leu His Glu Val Asp Lys Asp Ile
1 5 10 15

Ser Gln Leu Thr Gln Ala Ile Val Lys Asn His Lys Asn Leu Leu Lys
20 25 30

Ile Ala Gln Tyr Ala Ala Gln Asn Arg Arg Gly Leu Asp Leu Leu
35 40 45

<210> SEQ ID NO 39
<211> LENGTH: 7
<212> TYPE: PRT
<213> ORGANISM: Artificial Sequence
<220> FEATURE:
<223> OTHER INFORMATION: Sequence related to viral fusion protein

<400> SEQUENCE: 39

Ser His Val Pro Ile Leu Gln
1 5

<210> SEQ ID NO 40
<211> LENGTH: 574
<212> TYPE: PRT
<213> ORGANISM: Artificial Sequence
<220> FEATURE:
<223> OTHER INFORMATION: Sequence related to viral fusion protein

<400> SEQUENCE: 40

Met Glu Leu Leu Ile His Arg Leu Ser Ala Ile Phe Leu Thr Leu Ala
1 5 10 15

Ile Asn Ala Leu Tyr Leu Thr Ser Ser Gln Asn Ile Thr Glu Glu Phe
20 25 30

Tyr Gln Ser Thr Cys Ser Ala Val Ser Arg Gly Tyr Phe Ser Ala Leu
35 40 45

Arg Thr Gly Trp Tyr Thr Ser Val Ile Thr Ile Glu Leu Ser Asn Ile
50 55 60

Lys Glu Thr Lys Cys Asn Gly Thr Asp Thr Lys Val Lys Leu Ile Lys
65 70 75 80

Gln Glu Leu Asp Lys Tyr Lys Asn Ala Val Thr Glu Leu Gln Leu Leu
85 90 95

Met Gln Asn Thr Pro Ala Ala Asn Asn Arg Ala Arg Arg Glu Ala Pro
100 105 110

Gln Tyr Met Asn Tyr Thr Ile Asn Thr Thr Lys Asn Leu Asn Val Ser
115 120 125

Ile Ser Lys Lys Arg Lys Arg Arg Phe Leu Gly Phe Leu Leu Gly Val
130 135 140

Gly Ser Ala Ile Ala Ser Gly Ile Ala Val Ser Lys Val Leu His Leu
145 150 155 160

Glu Gly Glu Val Asn Lys Ile Lys Asn Ala Leu Leu Ser Thr Asn Lys
165 170 175

Ala Val Val Ser Leu Ser Asn Gly Val Ser Val Leu Thr Ser Lys Val
180 185 190

Leu Asp Leu Lys Asn Tyr Ile Asn Asn Gln Leu Leu Pro Ile Val Asn
195 200 205

Gln Gln Ser Cys Arg Ile Ser Asn Ile Glu Thr Val Ile Glu Phe Gln
210 215 220

Gln Lys Asn Ser Arg Leu Leu Glu Ile Asn Arg Glu Phe Ser Val Asn
225 230 235 240

Ala Gly Val Thr Thr Pro Leu Ser Thr Tyr Met Leu Thr Asn Ser Glu
245 250 255

Leu Leu Ser Leu Ile Asn Asp Met Pro Ile Thr Asn Asp Gln Lys Lys
260 265 270

```
Leu Met Ser Ser Asn Val Gln Ile Val Arg Gln Gln Ser Tyr Ser Ile
        275                 280                 285

Met Ser Ile Ile Lys Glu Glu Val Leu Ala Tyr Val Val Gln Leu Pro
    290                 295                 300

Ile Tyr Gly Val Ile Asp Thr Pro Cys Trp Lys Leu His Thr Ser Pro
305                 310                 315                 320

Leu Cys Thr Thr Asn Ile Lys Glu Gly Ser Asn Ile Cys Leu Thr Arg
                325                 330                 335

Thr Asp Arg Gly Trp Tyr Cys Asp Asn Ala Gly Ser Val Ser Phe Phe
            340                 345                 350

Pro Gln Ala Asp Thr Cys Lys Val Gln Ser Asn Arg Val Phe Cys Asp
        355                 360                 365

Thr Met Asn Ser Leu Thr Leu Pro Ser Glu Val Ser Leu Cys Asn Thr
    370                 375                 380

Asp Ile Phe Asn Ser Lys Tyr Asp Cys Lys Ile Met Thr Ser Lys Thr
385                 390                 395                 400

Asp Ile Ser Ser Ser Val Ile Thr Ser Leu Gly Ala Ile Val Ser Cys
                405                 410                 415

Tyr Gly Lys Thr Lys Cys Thr Ala Ser Asn Lys Asn Arg Gly Ile Ile
            420                 425                 430

Lys Thr Phe Ser Asn Gly Cys Asp Tyr Val Ser Asn Lys Gly Val Asp
        435                 440                 445

Thr Val Ser Val Gly Asn Thr Leu Tyr Tyr Val Asn Lys Leu Glu Gly
    450                 455                 460

Lys Asn Leu Tyr Val Lys Gly Glu Pro Ile Ile Asn Tyr Tyr Asp Pro
465                 470                 475                 480

Leu Val Phe Pro Ser Asp Glu Phe Asp Ala Ser Ile Ser Gln Val Asn
                485                 490                 495

Glu Lys Ile Asn Gln Ser Leu Ala Phe Ile Arg Arg Ser Asp Glu Leu
            500                 505                 510

Leu His Asn Val Asn Thr Gly Lys Ser Thr Thr Asn Ile Met Ile Thr
        515                 520                 525

Thr Ile Ile Ile Val Ile Ile Val Val Leu Leu Ser Leu Ile Ala Ile
    530                 535                 540

Gly Leu Leu Leu Tyr Cys Lys Ala Lys Asn Thr Pro Val Thr Leu Ser
545                 550                 555                 560

Lys Asp Gln Leu Ser Gly Ile Asn Asn Ile Ala Phe Ser Lys
                565                 570
```

<210> SEQ ID NO 41
<211> LENGTH: 57
<212> TYPE: PRT
<213> ORGANISM: Artificial Sequence
<220> FEATURE:
<223> OTHER INFORMATION: Sequence related to viral fusion protein

<400> SEQUENCE: 41

```
Ala Val Ser Lys Val Leu His Leu Glu Gly Glu Val Asn Lys Ile Lys
1               5                   10                  15

Asn Ala Leu Leu Ser Thr Asn Lys Ala Val Val Ser Leu Ser Asn Gly
            20                  25                  30

Val Ser Val Leu Thr Ser Lys Val Leu Asp Leu Lys Asn Tyr Ile Asn
        35                  40                  45

Asn Gln Leu Leu Pro Ile Val Asn Gln
    50                  55
```

<210> SEQ ID NO 42
<211> LENGTH: 49
<212> TYPE: PRT
<213> ORGANISM: Artificial Sequence
<220> FEATURE:
<223> OTHER INFORMATION: Sequence related to viral fusion protein

<400> SEQUENCE: 42

```
Asn Tyr Tyr Asp Pro Leu Val Phe Pro Ser Asp Glu Phe Asp Ala Ser
1               5                   10                  15

Ile Ser Gln Val Asn Glu Lys Ile Asn Gln Ser Leu Ala Phe Ile Arg
            20                  25                  30

Arg Ser Asp Glu Leu Leu His Asn Val Asn Thr Gly Lys Ser Thr Thr
        35                  40                  45

Asn
```

<210> SEQ ID NO 43
<211> LENGTH: 529
<212> TYPE: PRT
<213> ORGANISM: Artificial Sequence
<220> FEATURE:
<223> OTHER INFORMATION: Sequence related to viral fusion protein

<400> SEQUENCE: 43

```
Met Gly Thr Ile Ile Gln Phe Leu Val Val Ser Cys Leu Leu Ala Gly
1               5                   10                  15

Ala Gly Ser Leu Asp Pro Ala Ala Leu Met Gln Ile Gly Val Ile Pro
            20                  25                  30

Thr Asn Val Arg Gln Leu Met Tyr Tyr Thr Glu Ala Ser Ser Ala Phe
        35                  40                  45

Ile Val Val Lys Leu Met Pro Thr Ile Asp Ser Pro Ile Ser Gly Cys
    50                  55                  60

Asn Ile Thr Ser Ile Ser Ser Tyr Asn Ala Thr Val Thr Lys Leu Leu
65                  70                  75                  80

Gln Pro Ile Gly Glu Asn Leu Glu Thr Ile Arg Asn Gln Leu Ile Pro
                85                  90                  95

Thr Arg Arg Arg Arg Arg Phe Ala Gly Val Val Ile Gly Leu Ala Ala
            100                 105                 110

Leu Gly Val Ala Thr Ala Ala Gln Val Thr Ala Ala Val Ala Leu Val
        115                 120                 125

Lys Ala Asn Glu Asn Ala Ala Ala Ile Leu Asn Leu Lys Asn Ala Ile
    130                 135                 140

Gln Lys Thr Asn Ala Ala Val Ala Asp Val Val Gln Ala Thr Gln Ser
145                 150                 155                 160

Leu Gly Thr Ala Val Gln Ala Val Gln Asp His Ile Asn Ser Val Val
                165                 170                 175

Ser Pro Ala Ile Thr Ala Ala Asn Cys Lys Ala Gln Asp Ala Ile Ile
            180                 185                 190

Gly Ser Ile Leu Asn Leu Tyr Leu Thr Glu Leu Thr Thr Ile Phe His
        195                 200                 205

Asn Gln Ile Thr Asn Pro Ala Leu Ser Pro Ile Thr Ile Gln Ala Leu
    210                 215                 220

Arg Ile Leu Leu Gly Ser Thr Leu Pro Thr Val Val Glu Lys Ser Phe
225                 230                 235                 240

Asn Thr Gln Ile Ser Ala Ala Glu Leu Leu Ser Ser Gly Leu Leu Thr
                245                 250                 255
```

Gly Gln Ile Val Gly Leu Asp Leu Thr Tyr Met Gln Met Val Ile Lys
260 265 270

Ile Glu Leu Pro Thr Leu Thr Val Gln Pro Ala Thr Gln Ile Ile Asp
275 280 285

Leu Ala Thr Ile Ser Ala Phe Ile Asn Asn Gln Glu Val Met Ala Gln
290 295 300

Leu Pro Thr Arg Val Met Val Thr Gly Ser Leu Ile Gln Ala Tyr Pro
305 310 315 320

Ala Ser Gln Cys Thr Ile Thr Pro Asn Thr Val Tyr Cys Arg Tyr Asn
325 330 335

Asp Ala Gln Val Leu Ser Asp Asp Thr Met Ala Cys Leu Gln Gly Asn
340 345 350

Leu Thr Arg Cys Thr Phe Ser Pro Val Val Gly Ser Phe Leu Thr Arg
355 360 365

Phe Val Leu Phe Asp Gly Ile Val Tyr Ala Asn Cys Arg Ser Met Leu
370 375 380

Cys Lys Cys Met Gln Pro Ala Ala Val Ile Leu Gln Pro Ser Ser Ser
385 390 395 400

Pro Val Thr Val Ile Asp Met Tyr Lys Cys Val Ser Leu Gln Leu Asp
405 410 415

Asn Leu Arg Phe Thr Ile Thr Gln Leu Ala Asn Val Thr Tyr Asn Ser
420 425 430

Thr Ile Lys Leu Glu Ser Ser Gln Ile Leu Ser Ile Asp Pro Leu Asp
435 440 445

Ile Ser Gln Asn Leu Ala Ala Val Asn Lys Ser Leu Ser Asp Ala Leu
450 455 460

Gln His Leu Ala Gln Ser Asp Thr Tyr Leu Ser Ala Ile Thr Ser Ala
465 470 475 480

Thr Thr Thr Ser Val Leu Ser Ile Ile Ala Ile Cys Leu Gly Ser Leu
485 490 495

Gly Leu Ile Leu Ile Ile Leu Leu Ser Val Val Val Trp Lys Leu Leu
500 505 510

Thr Ile Val Val Ala Asn Arg Asn Arg Met Glu Asn Phe Val Tyr His
515 520 525

Lys

<210> SEQ ID NO 44
<211> LENGTH: 62
<212> TYPE: PRT
<213> ORGANISM: Artificial Sequence
<220> FEATURE:
<223> OTHER INFORMATION: Sequence related to viral fusion protein

<400> SEQUENCE: 44

Ala Ala Val Ala Leu Val Lys Ala Asn Glu Asn Ala Ala Ala Ile Leu
1 5 10 15

Asn Leu Lys Asn Ala Ile Gln Lys Thr Asn Ala Ala Val Ala Asp Val
20 25 30

Val Gln Ala Thr Gln Ser Leu Gly Thr Ala Val Gln Ala Val Gln Asp
35 40 45

His Ile Asn Ser Val Val Ser Pro Ala Ile Thr Ala Ala Asn
50 55 60

<210> SEQ ID NO 45
<211> LENGTH: 43

-continued

```
<212> TYPE: PRT
<213> ORGANISM: Artificial Sequence
<220> FEATURE:
<223> OTHER INFORMATION: Sequence related to viral fusion protein

<400> SEQUENCE: 45

Lys Leu Glu Ser Ser Gln Ile Leu Ser Ile Asp Pro Leu Asp Ile Ser
1               5                   10                  15

Gln Asn Leu Ala Ala Val Asn Lys Ser Leu Ser Asp Ala Leu Gln His
            20                  25                  30

Leu Ala Gln Ser Asp Thr Tyr Leu Ser Ala Ile
        35                  40
```